United States Patent [19]

Engel et al.

[11] Patent Number: 4,522,159
[45] Date of Patent: Jun. 11, 1985

[54] GASEOUS HYDROCARBON FUEL STORAGE SYSTEM AND POWER PLANT FOR VEHICLES AND ASSOCIATED REFUELING APPARATUS

[75] Inventors: Larry J. Engel, Rochester; John W. Turko, River Rouge, both of Mich.

[73] Assignee: Michigan Consolidated Gas Co., Detroit, Mich.

[21] Appl. No.: 484,521

[22] Filed: Apr. 13, 1983

[51] Int. Cl.³ .............................................. F02B 43/00
[52] U.S. Cl. ..................................... 123/1 A; 123/527; 123/528; 48/190; 62/473
[58] Field of Search ............... 123/1 A, 525, 527, 559, 123/528; 48/190; 206/0.6, 0.7; 62/473

[56] References Cited

U.S. PATENT DOCUMENTS

| | | | |
|---|---|---|---|
| 2,663,626 | 12/1953 | Spangler | 48/190 |
| 2,681,167 | 6/1954 | Weisz | 222/3 |
| 2,712,730 | 7/1955 | Spangler | 48/190 |
| 2,882,243 | 4/1959 | Milton | 252/455 Z |
| 3,021,689 | 2/1962 | Miller | 62/473 |
| 3,565,201 | 2/1971 | Petsinger | 123/527 |
| 3,688,755 | 9/1972 | Grayson et al. | 123/527 |
| 3,719,196 | 3/1973 | McJones | 137/256 |
| 3,807,422 | 4/1974 | McJones | 137/256 |
| 3,844,306 | 10/1974 | Hill | 222/6 |
| 3,847,173 | 11/1974 | Hill | 222/6 |
| 3,906,915 | 9/1975 | Bednarczyk et al. | 123/3 |
| 3,926,168 | 12/1975 | Csicsery | 123/3 |
| 3,960,769 | 6/1976 | Munzner et al. | 252/445 |
| 4,010,623 | 3/1977 | Kaschak | 141/5 X |
| 4,016,836 | 4/1977 | MacKay et al. | 123/1 A |
| 4,046,709 | 9/1977 | Yuki | 252/445 |
| 4,178,882 | 12/1979 | Anderson et al. | 123/1 A |
| 4,225,320 | 9/1980 | Gell | 206/0.6 |
| 4,227,497 | 10/1980 | Mathieson | 123/525 |
| 4,253,428 | 3/1981 | Billings et al. | 123/1 A |
| 4,287,166 | 9/1981 | Dwyer | 252/455 Z |
| 4,341,234 | 7/1982 | Meinass et al. | 222/6 |
| 4,343,770 | 8/1982 | Simons | 206/0.7 |

OTHER PUBLICATIONS

"Sorbent-Containing Storage Systems for Natural Gas Powered Vehicles", by Amos Golovoy, Ford Motor Company, Dearborn, Michigan.
"Properties of Natural Zeolites"–U.S. Dept. of the Interior, RI 7744, Bureau of Mines Report of Investigations/1973.

(List continued on next page.)

Primary Examiner—E. Rollins Cross
Attorney, Agent, or Firm—Harness, Dickey & Pierce

[57] ABSTRACT

A low pressure gaseous hydrocarbon fuel storage system and power plant is described which generally comprises on-board means for storing a self-contained supply of a gaseous hydrocarbon fuel, a prime mover, means for conveying the gaseous hydrocarbon fuel to and from the storing means, and means for controlling the flow of the gaseous hydrocarbon fuel from the storing means to the prime mover. The on-board storing means, which may include one or more vessels or cylinders, contains a predetermined sorbent material for reducing the pressure at which the gaseous hydrocarbon fuel is stored. The conveying means is adapted to convey the gaseous hydrocarbon fuel to the on-board storing means from a stationary source of the gaseous hydrocarbon fuel, and also to convey the gaseous hydrocarbon fuel from the storing means to the combining means of the prime mover during the operation of the vehicle. In the preferred embodiment, the maximum pressure at which the gaseous hydrocarbon fuel is stored in the on-board storing means is in the range of approximately 100 psig (689 kPa) to approximately 400 psig (2760kPa). The apparatus generally includes one or more gas compressors for compressing the gaseous fuel to a predetermined pressure, preferably approximately 400 psig (2760 kPa). Sorbent filtering and storage means are also preferably provided for maximizing the amount of fuel to be stored in the apparatus in order to supply a quick initial charge of the gaseous fuel to the vehicle or other gaseous fuel consuming device.

34 Claims, 20 Drawing Figures

OTHER PUBLICATIONS

"Natural Gas Storage with Zeolites", by Ronald A. Munson and Robert A. Clifton, Jr.–Bureau of Mines Nonmetallic Minerals Program, U.S. Dept. Interior, 8/71.

"Natural Zeolites: Their Properties, Occurrences, and Uses"–R. A. Munson and R. A. Sheppard, Minerals Science and Engineering–Jan. 1974.

"Low Pressure Methane Storage System for Vehicles–Preliminary Concept Evaluation"–J. Braslaw, J. Nasea, Jr. and A. Golovoy, Ford Motor Co., MI-1/82.

"Hydrogen as an Automotive Fuel": by Jim Epperson, Michigan Technic–Apr. 1974, (pp. 6-7).

"Compressed Natural Gas (CNG): A Vehicle Fuel for Utility Company Fleets–The Pros and Cons"–American Gas Association–Feb. 1982.

"Assessment of Methane-Related Fuels for Automotive Fleet Vehicles"–U.S. Dept. of Energy–Feb. 1982, pp. 2-1 through 2-41; 3-1 through 3-21; and 9-1 through 9-4. (vol. 2 of 3 volumes); pp. D1 through D6, (vol. 3 of 3 volumes); and vol. 1 of 3 volumes.

"State-of-the-Art Assessment of Methane-Fueled Vehicles"–U.S. Dept. of Energy, Feb. 1982–DOE/-CE-0026.

"Adsorption of Methane on Active Carbons and Zeolites", by K. Otto, Ford Motor Company, Dearborn, Michigan.

"Are Other Concepts Pushing Diesels into Background at Ford?", by Al Wrigley–Automotive Diesel Progress, Aug. 1981.

S.A.E. Technical Paper 830382, "On-Board Storage and Home Refueling Options for Natural Gas Vehicles", by A. Golovoy and J. Braslaw, published and presented by S.A.E. International Congress & Exposition in Det., MI 2/28-3/4/83.

"The Quest for Alternative Fuels", Detroit Engineer, Nov. 1983, pp. 6-9.

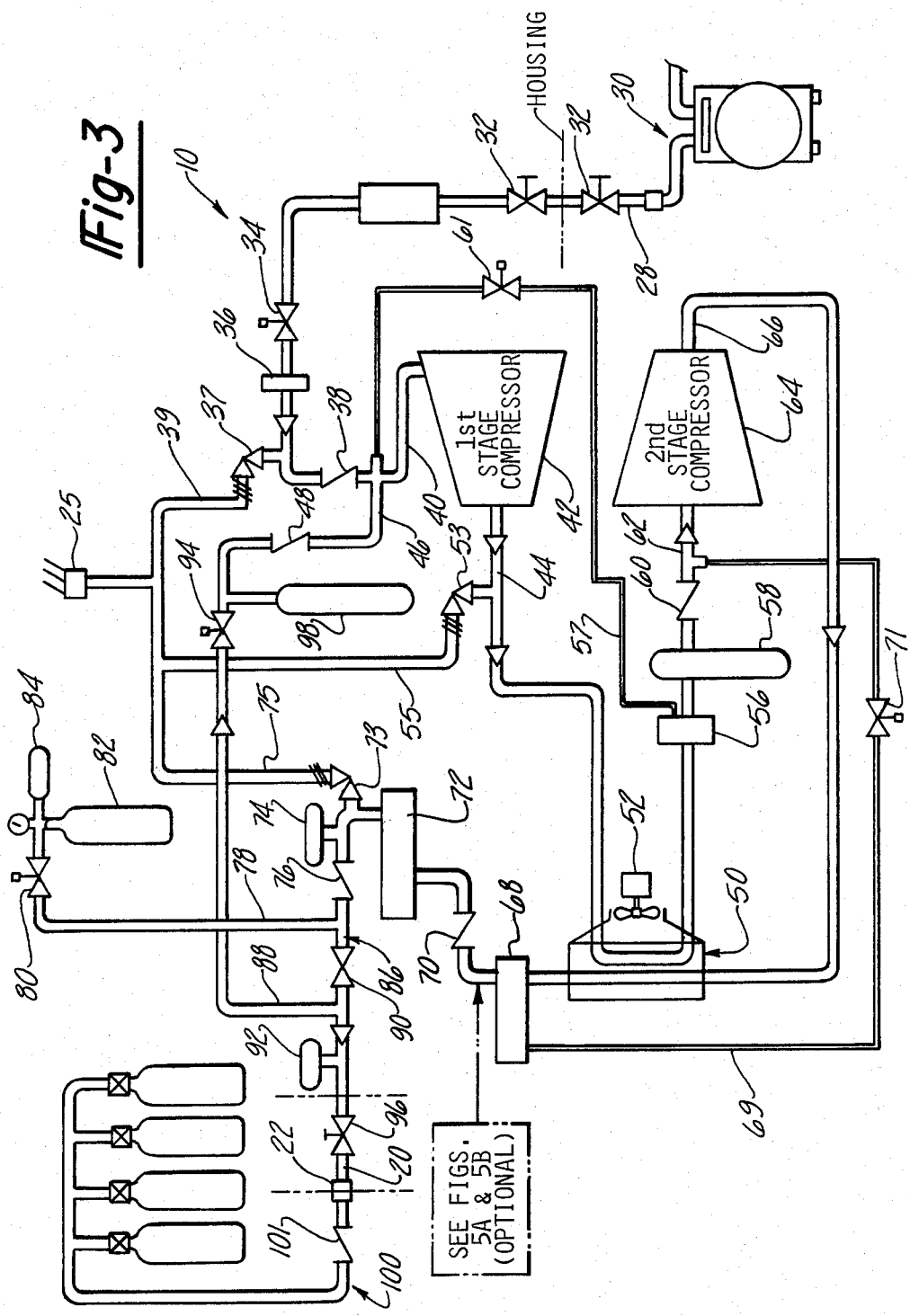

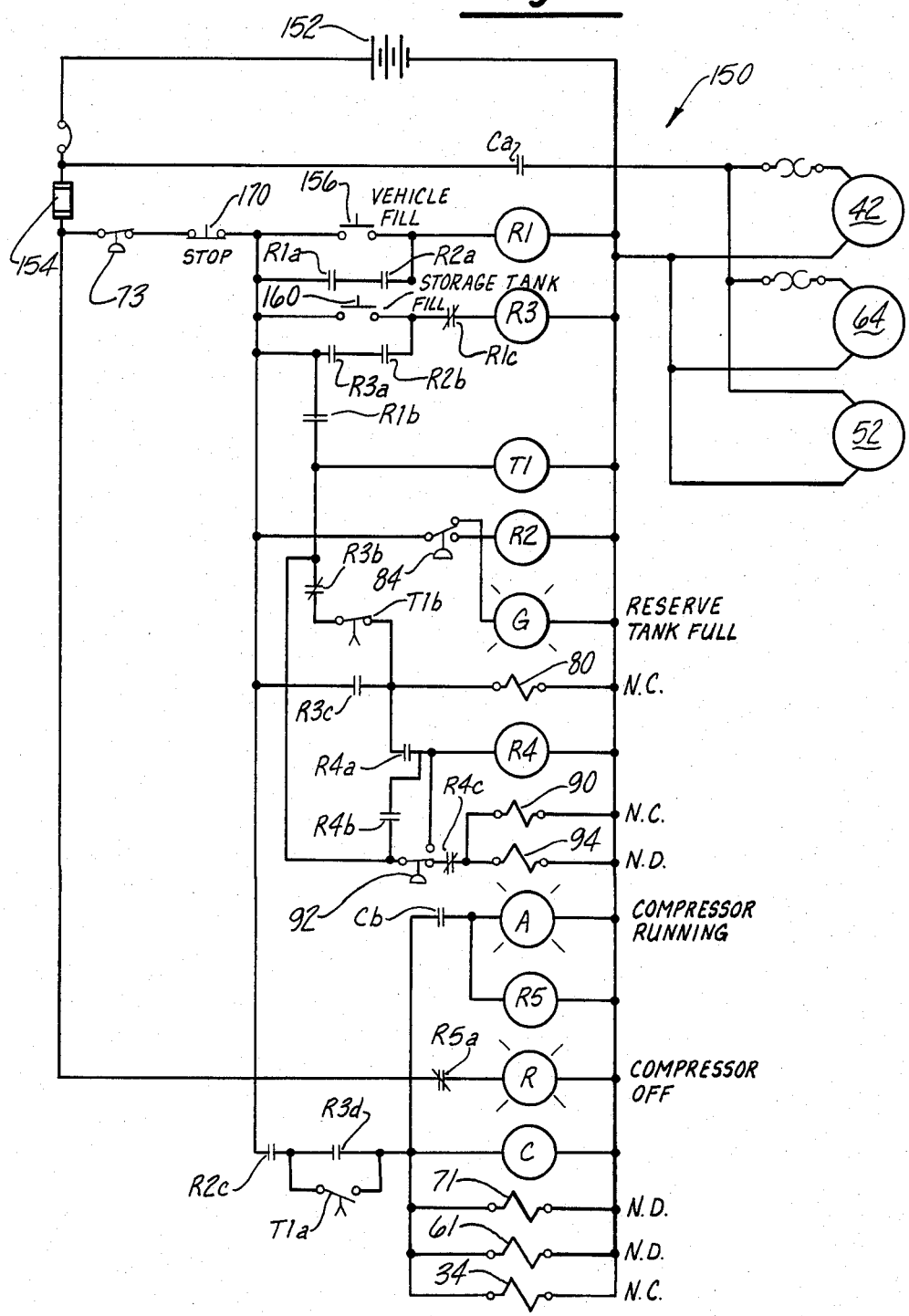

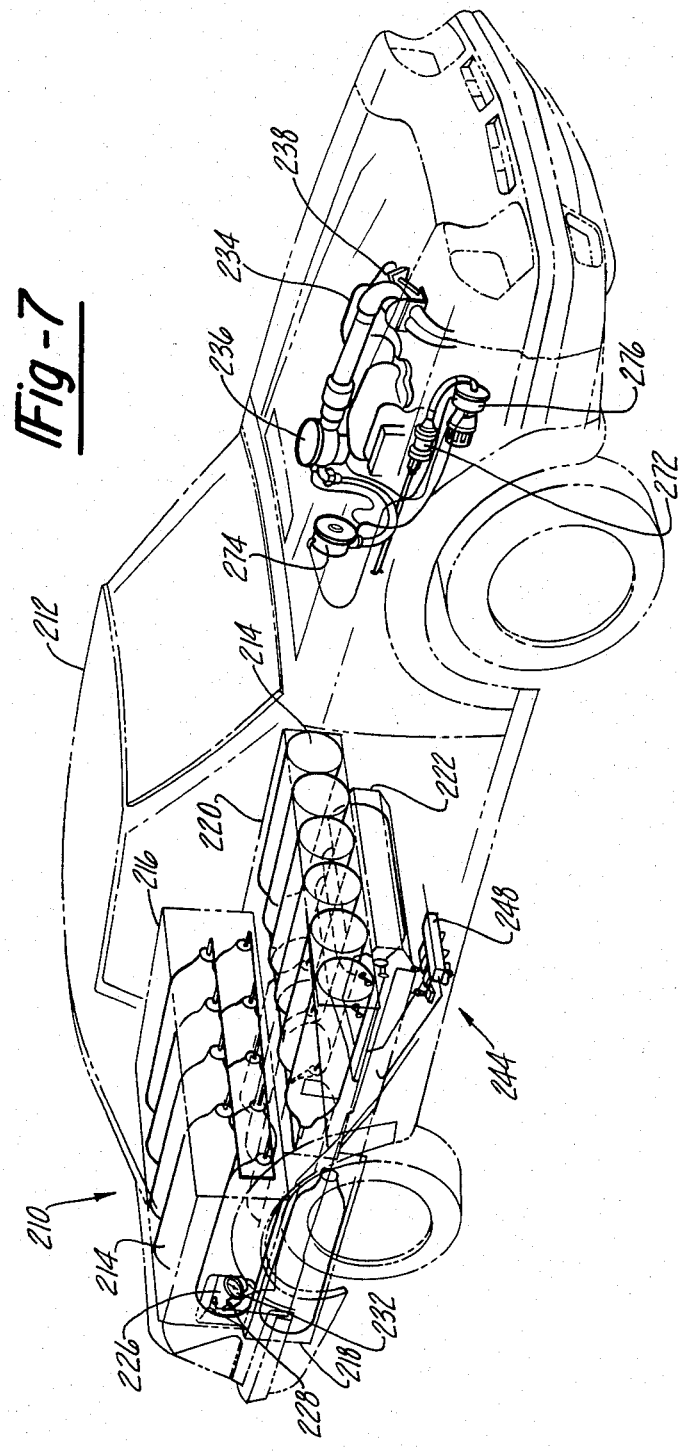

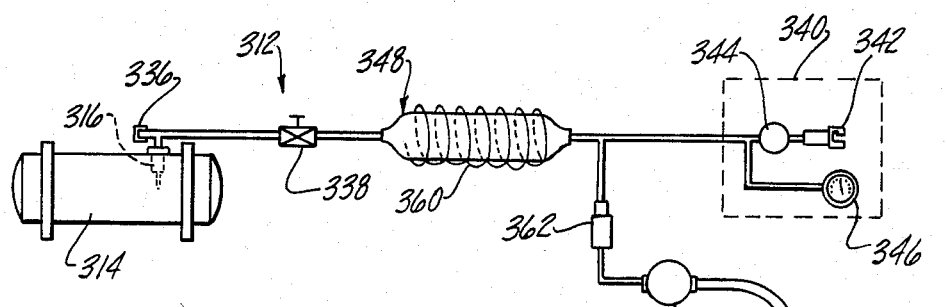
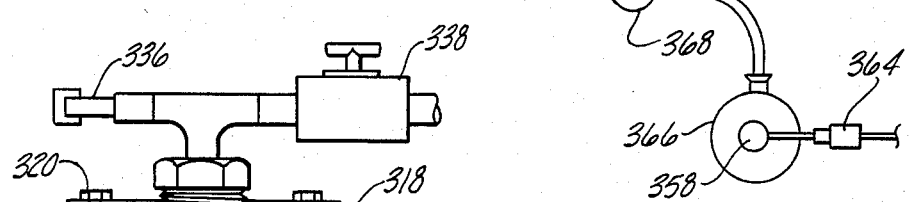
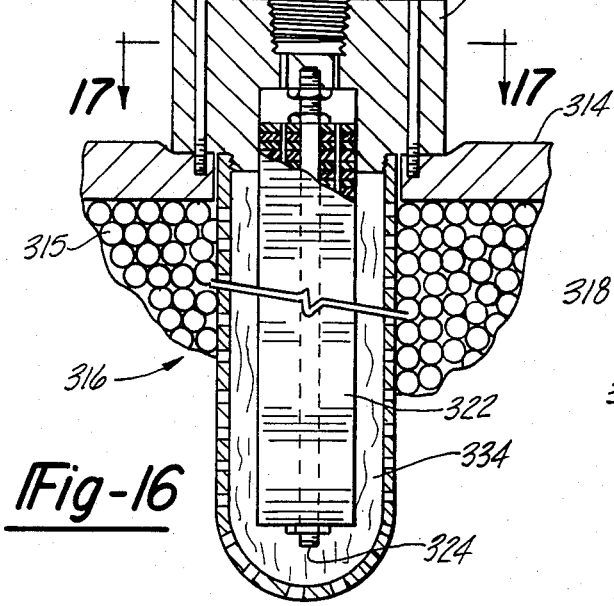
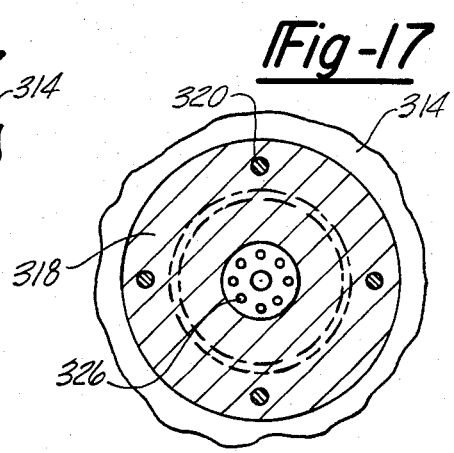
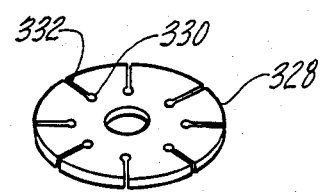
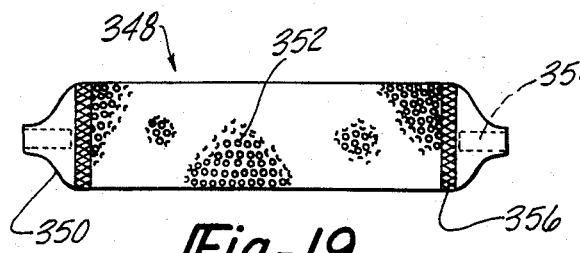

GASEOUS HYDROCARBON FUEL STORAGE SYSTEM AND POWER PLANT FOR VEHICLES AND ASSOCIATED REFUELING APPARATUS

BACKGROUND AND SUMMARY OF THE INVENTION

The invention relates generally to transportation vehicles or other devices fueled by natural gas or other gaseous fuels stored at low pressure. More particularly, the invention relates to such vehicles or devices having fuel storage apparatus employing high-surface-area adsorptive materials and also to refueling apparatus for such vehicles, such refueling apparatus preferably employing hermetically-sealed gas compressor apparatus for pressurizing the gaseous fuel to a desired pressure.

Over the years, concerns have developed over the availability of conventional fuels (such as gasoline or diesel fuel) for internal combustion engine vehicles, the operating costs and fuel efficiencies of such vehicles, and the potentially adverse effects of vehicle emissions on the environment. Because of such concern, much emphasis has been placed on the development of alternatives to such conventional vehicle fuels. One area of such emphasis has been the development of vehicles fueled by natural gas or other methane-type gaseous fuels, either as the sole fuel or as one fuel in a dual-fuel system. As a result, vehicles using such fuels have been produced and are currently in use both domestically and abroad.

For example, it has been estimated that as many as 275,000 natural gas powered vehicles are currently in use in Italy alone. Indeed, natural gas has been used continuously in Italy as a motive fuel for at least 40 years. Natural gas has also been used as a motive fuel for vehicles in several other foreign countries, including France, New Zealand, Canada, Iran, Australia, Holland and the United Kingdom.

In the United States, it has been estimated that approximately 20,000 vehicles presently use natural gas. One of the initial efforts to employ natural gas as a vehicular fuel is represented by the Southern California Gas Company's conversion of approximately 1000 vehicles to a compressed natural gas (CNG) fueling system during 1969 and 1970. Today, dual-fuel conversion systems which enable an otherwise conventional vehicle to operate on either gasoline or natural gas are commercially available from several domestic and foreign manufacturers. While conversion kits to permit an otherwise conventional vehicle to operate solely on natural gas are not known to be generally commercially available, the Ford Motor Company has recently built a demonstration vehicle of this kind. This vehicle is based upon a Ford LN7 model 2-passenger automobile, and includes lightweight storage cylinders which are used to store a self-contained supply of natural gas.

A more detailed discussion of the development and use of natural gas as a motive fuel for vehicles may be found in the following publications, which are hereby incorporated by reference: "Compressed Natural Gas (CNG): A Vehicle Fuel for Utility Company Fleets—the Pros and Cons", American Gas Association, an operating section report issued February 1982; "Assessment of Methane-Related Fuels for Automotive Fleet Vehicles", prepared for the Department of Energy (DOE/CE/50179-1) by The Aerospace Corporation, February 1982.

In order to provide such gaseous fueled vehicles with a reasonable range of travel between refuelings, it has previously been necessary to store the on-board gaseous fuel at very high pressures, generally in the range of approximately 2000 psig (13.9 MPa) to 3000 psig (20.7 MPa). Without such high-pressure on-board storage, the practical storage capacity of such vehicles was limited because of space and weight factors to the energy equivalent of approximately one to five gallons (3.7 to 19 liters) of conventional gasoline. Thus, by compressing the gaseous fuel to such high pressures, the on-board storage capacities of such vehicles were increased.

One disadvantage of the compressed gaseous fuel systems discussed above is that they require complex and comparatively expensive and refueling apparatus in order to compress the fuel to such high pressures. Such refueling apparatus has been found to effectively preclude refueling the vehicle from a user's residential natural gas supply system as being commercially impractical on an individual ownership basis. Furthermore, such high pressure apparatus is frequently perceived by the public as being more dangerous than low pressure apparatus. For example, the public is already accustomed to refrigerant pressures in the area of approximately 200 psig (1380 KPa) in home refrigeration units and does not find such low pressures objectionable.

Another disadvantage of high pressure on-board natural gas storage systems is that heavy walled containers must typically be used, thereby increasing the cost and weight of the system. Additionally, as the cylinders are discharged during the operation of the vehicle, significant condensation on the cylinders and associated piping can occur as a result of the magnitude of the decrease in the pressure inside the cylinder.

Another alternative to the above discussed fuel storage and vehicle range problems, has been to store the on-board fuel in a liquid state generally at or near atmospheric pressure in order to allow sufficient quantities of fuel to be carried on board the vehicles to provide reasonable travel ranges between refuelings. Such liquefied gas storage may be disadvantageous if it involves complex and comparatively expensive cryogenic equipment, both on board the vehicle and in the refueling station, in order to establish and maintain the necessary low gas temperatures.

In non-vehicular gaseous fuel storage applications for stationary installations, it has been found that the use of high-surface-area adsorptive materials has provided for significantly increased storage capacities at relatively low pressures. Such adsorptive materials typically include zeolites, activated carbons and silica gels. For example, the Spangler U.S. Pat. No. 2,712,730, issued on July 12, 1955, discloses a method and apparatus for storing various types of (liquefied) hydrocarbon gases which utilizes an adsorbent in order to increase the storage capacity of the stationary system.

In vehicular applications, the use of high-surface-area materials to adsorb natural gas was suggested as a potential means for increasing the on-board gas storage capacity at least as early as August 1971, in a report entitled "Natural Gas Storage With Zeolites". This report by Ronald A. Munson and Robert A. Clifton, Jr. was published by the U.S. Department Of The Interior, Bureau of Mines (technical progress report 38), and is hereby incorporated by reference. A preliminary analysis of this concept was also presented in Section 2.2.3 of the "Assessment of Methane-Related Fuels for Automotive Fleet Vehicles" report identified above. The calculations used in this analysis indicated that a natural gas storage system utilizing adsorption would weigh approximately twice as much as a conventional high-pressure natural gas storage system.

The extent to which research efforts have been directed to developing a vehicular adsorption fuel storage system are exemplified by the recent efforts of the Ford Motor Company. Two papers were presented at the Fourth International Conference on Alternative Energy Sources, Miami Beach, Fla., December 1981, namely "Adsorption of Methane on Active Carbons and Zeolites" by K. Otto, and "Low Pressure Methane Storage Systems For Vehicles—Preliminary Concept Evaluation" by J. Braslow et al, which are both hereby incorporated by reference. These papers discussed laboratory experiments directed to determining the effect of the heat of methane adsorption on carbon capacity and the limitations of methane storage by adsorption.

Significantly, in Ford's most recent paper it was concluded that for on-board methane storage "the preferred option is to store the gaseous fuel at high pressures, e.g. 17 MPa [2500 psig] or higher, without the use of sorbents". Indeed, it was also stated that "it is difficult to imagine on-board methane storage below about 17 MPa, unless a very good sorbent is employed". This paper entitled "Sorbent-Containing Storage Systems For Natural Gas Powered Vehicles" by Amos Golovoy, was presented at a meeting of the Society of Automotive Engineers, Detroit, Mich., February 1983, and is hereby incorporated by reference.

Accordingly, in spite of significant and extensive research and development efforts in the area of gaseous fuel powered vehicles, no natural gas fuel storage or refueling systems have emerged that apply sorbent storage technology to on-board vehicular storage and to their refueling apparatus. In fact, the above-discussed compressed natural gas and liquefied natural gas systems have been generally regarded as the only two feasible systems for natural gas powered vehicle applications.

The need has thus arisen for a hydrocarbon gaseous fuel powered vehicle that is capable of providing reasonable quantities of on-board fuel storage at relatively low pressures, and for practical and inexpensive refueling apparatus allowing such a vehicle to be refueled by the user from a residential natural gas supply system.

One of the primary objectives of the present invention is to provide a low pressure gaseous hydrocarbon fuel storage system and power plant for a vehicle in which sorption is used to reduce the pressure at which the gaseous hydrocarbon fuel is stored, as well as a refueling apparatus for such vehicle that may be relatively inexpensively manufactured in a compact, modular form and that is adapted to be connected to a user's residential natural gas or other gaseous fuel supply system. Another of the primary objectives of the present invention is to provide such a vehicle and refueling apparatus that can be conveniently, safely, and comparatively inexpensively operated and used by the consumer. Such a vehicle is also disclosed in a patent application entitled "GASEOUS HYDROCARBON FUEL STORAGE SYSTEM AND POWER PLANT FOR VEHICLES", and such a refueling apparatus is also disclosed in a patent application entitled "GASEOUS FUEL REFUELING SYSTEM". Both of said applications, which are incorporated by reference herein, are assigned to the same assignee as the present application and are filed of even date.

Another objective of the present invention is to provide a low pressure gaseous hydrocarbon fuel storage system and power plant in which the gaseous hydrocarbon fuel is sorptively filtered before being conveyed to a storage means on-board the vehicle. A related objective is to provide a sorptive filter on-board the vehicle which is self-cleaning during the operation of the vehicle.

A further objective of the present invention is to provide a low pressure gaseous hydrocarbon fuel storage system and power plant which is capable of utilizing a plurality of storage vessels in order to provide a self-contained supply of gaseous hydrocarbon fuel on board the vehicle.

An additional objective of the present invention is to provide a low pressure gaseous hydrocarbon fuel storage system and power plant which is capable of being utilized in both single fuel and dual fuel supply systems.

It is yet another objective of the present invention to provide a low pressure gaseous hydrocarbon fuel storage system and power plant which is capable of being refueled from either a high pressure or preferably a low pressure stationary source of the gaseous hydrocarbon fuel.

It is a more specific objective of the present invention to provide a vehicular natural gas storage system and power plant and an associated refueling apparatus, both of which are economical, operate at pressures below 500 psig (3450 kPa), and also provide for a reasonable driving range for the vehicle.

To achieve the foregoing objectives, the present invention provides a low pressure gaseous hydrocarbon fuel vehicular storage system and power plant, which generally comprise means for on-board storage of a self-contained supply of the gaseous hydrocarbon fuel, a prime mover, means for conveying the gaseous hydrocarbon fuel to and from the on-board storing means, and means for controlling the pressure of the gaseous hydrocarbon fuel from the on-board storing means to the prime mover. The on-board storing means, which may include one or more vessels or cylinders, contains a predetermined sorbent material for allowing a given amount of the gaseous hydrocarbon fuel to be stored at a lower pressure. The prime mover, such as an internal combustion engine, has means for combining the gaseous hydrocarbon fuel with air to produce the mechanical energy therefrom necessary to move the vehicle. The conveying means is adapted to convey the gaseous hydrocarbon fuel to the on-board storing means from a stationary refueling apparatus, and also to convey the gaseous hydrocarbon fuel from the on-board storing means to the combining means of the prime mover during the operation of the vehicle. In the preferred embodiment, the maximum pressure at which the gaseous hydrocarbon fuel is stored in the on-board storing means is in the range of approximately 100 psig (689 kPa) to approximately 400 psig (2760 kPa).

One of the significant advantages of the present invention is the use of an on-board sorptive filter which is interposed in the conveying means between the storage means and the prime mover. When the vehicle fuel storage system is being charged, this filter sorptively removes predetermined constituents from the gaseous hydrocarbon fuel before the gaseous hydrocarbon fuel is conveyed to the storing means. Subsequently, when the prime mover is energized and the gaseous hydrocarbon fuel is conveyed from the storage means to the prime mover for consumption therein, the filter desorptively reintroduces the removed predetermined constituents to the flow of the gaseous hydrocarbon fuel being conveyed to the prime mover. Accordingly, the on-board sorptive filter not only prevents certain undesirable fuel constituents or contaminants from being introduced into the storage means, but it also operates as a self-cleaning or regenerative filter during the operation of the vehicle.

Another significant aspect of the present invention arises in connection with the use of a plurality of vessels or cylinders to store the gaseous hydrocarbon fuel. Specifically, a manifold means is provided for distributing the gaseous hydrocarbon fuel received from the stationary source to each of the plurality of vessels and for collecting the gaseous hydrocarbon fuel stored in one or a plurality of vessels in order to convey this fuel to the primer mover or engine. The manifold means also operates to equalize pressure and with provision of a pressure relief valve insures that the pressure in the vessels do not exceed a predetermined pressure, filters the gaseous hydrocarbon fuel flow to the vessels, senses the pressure within the vessels, and is capable of selectively controlling the flow of fuel to and from the storage vessels. The storage vessels may also be enclosed in one or more chambers which are separated from the passenger compartment of the vehicle, and vented to the atmosphere exterior of the vehicle.

Also in accordance with the present invention, an apparatus for supplying fuel to the vehicle or other gaseous fuel consuming device, such as a vehicle, a lawn mower, or a snow thrower, for example, is adapted to be connected in fluid communication with a source of gaseous fuel and generally includes means for compressing the fuel in order to increase its pressure to a predetermined value, cooling means for reducing the temperature of the compressed gaseous fuel, and discharge means adapted to be releasably connected to the gaseous fuel consuming device. Preferably, the gaseous fuel supply apparatus also includes sorbent filter means for substantially removing impurities and predetermined fuel constituents from the fuel and eliminating oil that may have been in vapor state from the compressor means, optional sorbent storage means for sorptively storing a quantity of the previously compressed gaseous fuel, and automatic control apparatus for allowing the compressed gaseous fuel to be supplied to the fuel consuming device through the discharge means either from the sorbent storage means or from the compressor means by bypassing the storage means, if such storage means is included.

In the preferred embodiment, the pressure of the compressed gaseous fuel supplied to the vehicle or other fuel consuming device is generally in the range of approximately 100 psig (689 kPa) to approximately 400 psig (2760 kPa). Furthermore, the compressor means preferably comprises one or more hermetically-sealed gas compressors for compressing gaseous fuel to such pressures, the compressors preferably being generally of the type of gas compressors commonly found in refrigeration equipment.

Additional objects, advantages and features of the present invention will become apparent from the following description and appended claims, taken in conjunction with the accompanying drawings.

BRIEF DESCRIPTION OF THE DRAWINGS

FIG. 3 is a schematic flow diagram of the exemplary refueling apparatus of FIG. 1.

FIG. 6 is a schematic diagram of the preferred electrical and control system for the refueling apparatus of FIG. 1.

FIG. 7 is an overall perspective view of an exemplary low pressure gaseous hydrocarbon fuel storage system and power plant for a vehicle or the like according to the present invention.

FIG. 15 is a schematic view of a second low pressure gaseous hydrocarbon fuel storage system and power plant in accordance with the present invention.

FIG. 16 is a cross-sectional view of a portion of the storage system shown in FIG. 15, particularly illustrating the in-line filter to the storage tanks.

FIG. 17 is a cross-sectional view of the filter assembly shown in FIG. 16, taken along lines 17—17.

FIG. 18 is a perspective view of one of the filter discs shown in FIG. 16.

FIG. 19 is a cross-sectional view of the adsorptive filter shown in FIG. 15.

DETAILED DESCRIPTION OF THE PREFERRED EMBODIMENTS

Figure 1:
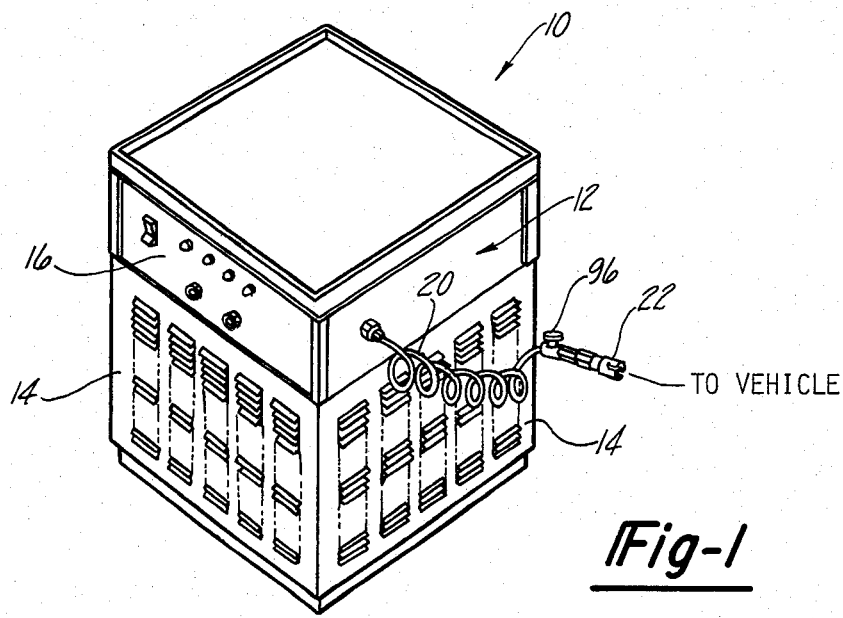
FIG. 1 is an overall perspective view of an exemplary gaseous fuel refueling apparatus according to the present invention.

FIGS. 1 through 19 depict exemplary embodiments, for purposes of illustration, of a gaseous fuel powered vehicle and associated refueling apparatus according to the present invention. One skilled in the art will readily recognize that the principles of the present invention are equally applicable to embodiments of gaseous fuel powered vehicles and refueling systems other than the particular embodiments shown in the drawings.

Referring to FIG. 1, a refueling module or apparatus 10 is preferably enclosed by a housing 12, which includes louvered portions 14 to allow for the circulation of air therethrough and a control panel 16 thereon. A flexible outlet conduit 20, with a suitable connector 22 at its free end, is adapted to be releasably connected to a vehicle or other gaseous fuel consuming device in order to discharge the gaseous fuel thereto. It should be noted at the outset that although the control panel 16 is located on the housing 12 in the exemplary refueling apparatus, the invention also contemplates a remote control panel mounted separate from the refueling module, such as inside the user's home, for example. As will be discussed below in more detail, the exemplary refueling module 10 is preferably constructed to be housed in a small, unobtrusive module-type package and is designed to operate on ordinary residential electrical supply systems (e.g. 110-230 volt systems) in order to provide a convenient and easy-to-operate system for home refueling of a gaseous fuel powered vehicle or other device. One skilled in the art will readily recognize, however, that the principles of the present invention are equally applicable to larger versions of a refueling module, which are adapted for commercial use and which are capable of simultaneous multi-vehicle refueling, for example.

Figure 2:
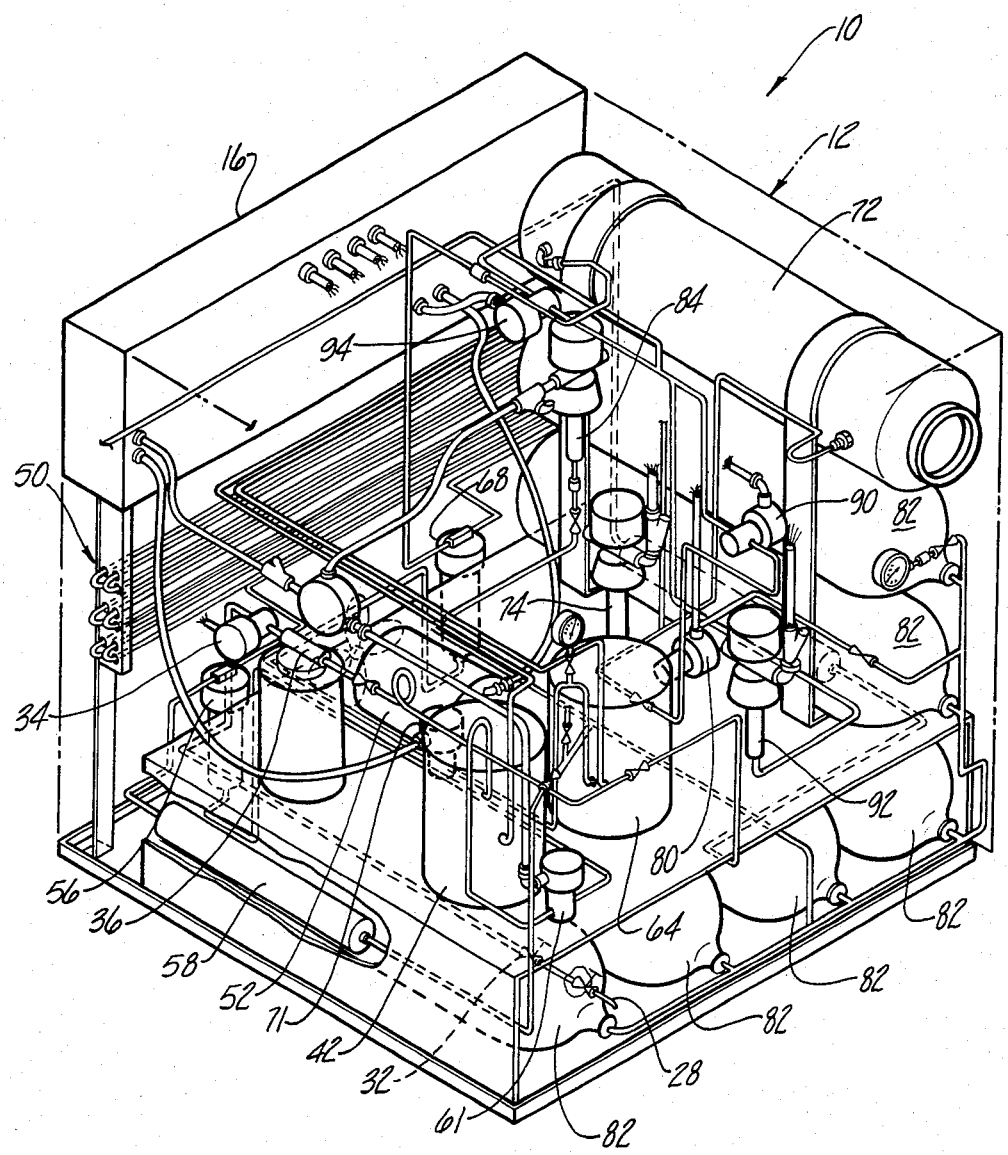
FIG. 2 is an enlarged perspective view of the refueling apparatus of FIG. 1, with its housing shown in phantom lines in order to reveal its internal components.

Referring to FIGS. 2 and 3, the exemplary refueling module 10 is generally illustrated both in perspective and in schematic views. The refueling module 10 includes an inlet 28 adapted to be connected to a gaseous fuel supply system 30 by means of a conventional connector device of the type known to those skilled in the art. Preferably, the gaseous fuel supply system 30 comprises a natural gas supply system such as that commonly found in many residential and commercial facilities. The exemplary refueling module 10 also preferably includes a pair of manual shut-off valves 32 for shutting down the module during extended periods of non-use or for isolating the module from the supply system 30 for purposes of servicing or repairing the module.

The gaseous fuel from the supply system 30 is typically at ¼ psig (1.72 kPa), for example, and flows through a preferably electrically-operated solenoid valve 34, a desiccant filter apparatus 36, and a check valve 38, into the suction 40 of a first stage gas compressor 42. Although various types of desiccant filters may be employed for removing water vapor or other moisture from the incoming gaseous fuel, the desiccant filter 36 preferably employs a sorbent material, such as an activated carbon, a zeolite material, or a silicon gel-type material, or various clays, for example. The first stage gas compressor 42 compresses the gaseous fuel, and thereby increases its pressure to a predetermined desired pressure level. In one actually-constructed prototype embodiment of the present invention, such predetermined gas pressure at the discharge 44 of the first stage gas compressor 42 was generally in the range of 5 to 60 psig (34 to 414 kPa). The exact pressure in any particular application of the present invention will, of course, depend upon the pressure in the discharge line 44 and may vary in accordance with various operating conditions and design factors such as whether or not an additional compressor is included in the refueling module to further compress the gaseous fuel, as well as other factors readily recognizable by those skilled in the art.

From the discharge 44 of the first stage gas compressor 42, the gaseous fuel flows through a gas cooler 50, which is preferably a cooling coil over which ambient air is forced by a cooling fan 52. In one actually-constructed prototype embodiment of the refueling module 10, the temperature of the gaseous fuel entering the gas cooler 50 was a maximum of approximately 240° F. (116° C.), and the gaseous fuel temperature on the outlet of the gas cooler 50 was substantially at ambient temperature. Although the gas cooler 50 has been depicted in the drawings as comprising the cooling coil apparatus described above, one skilled in the art will readily recognize that other types of heat exchanger apparatus or cooling means may alternately be employed to reduce the temperature of the compressed gaseous fuel from the discharge 44 of the first stage gas compressor 42.

From the gas cooler 50, the compressed gaseous fuel preferably flows through a lubricant filter and separator 56, an interstage accumulator or pulsation chamber 58, and a check valve 60, into the suction 62 of a second stage gas compressor 64, where it is further compressed to further increase its pressure to another predetermined pressure level. The lubricant filter and separator 56 may comprise any of a number of known filter-type devices adapted to remove lubricating oil or liquids from a gas stream passing therethrough. The lubricant filter and separator 56 functions to return compressor lubricants to the suction 40 of the first stage gas compressor 42 in a manner which will be described in detail below. The pulsation chamber 58 is an accumulator-type vessel, which serves to damp out any gas pressure surges or pulsations from the first stage compressor 42.

Unexpectedly, it was found that hermetically-sealed gas compressors of the type commonly employed in refrigeration apparatus were ideally mounted for use as the first and second stage compressors described above. Such compressors are inexpensive, durable and readily available as off-the-shelf items. One skilled in the art will recognize, of course, that other compressors may alternatively be used.

The second stage gas compressor 64 further compresses the previously-compressed gaseous fuel to a pressure in a range of approximately 100 psig (689 kPa) to approximately 400 psig (2760 kPa), such discharge pressure preferably being approximately 300 to 350 psig (2070 to 2410 kPa). The exact discharge pressure from the second stage gas compressor 64 will, of course, depend upon the pressure in the discharge line 66. One skilled in the art will, of course, readily recognize that either a single two-stage compressor, or even a single one-stage compressor, may be substituted for the two compressors 42 and 64 in order to compress the gaseous fuel to the desired pressures. Preferably in such case, the single two-stage compressor would include appropriate inlets and outlets for interstage connection of the gas cooler 50. Alternatively, if only a single, one-stage compressor is employed, the gas cooler 50 would be connected to the discharge side of such a compressor.

From the discharge 66 of the second stage gas compressor 64, the compressed gaseous fuel preferably flows back through the gas cooler 50, where it is again cooled from a maximum temperature of approximately 240 F. (116 C.) to substantially ambient temperature at the outlet of the gas cooler. The cooled and compressed gaseous fuel then flows through a second lubricant filter and separator 68, which is substantially similar to the previously-mentioned lubricant filter and separator 56, and which serves the same function of returning compressor lubricants to the suction 62 of the second stage gas compressor 64 as will be described in detail below.

Figure 5A:
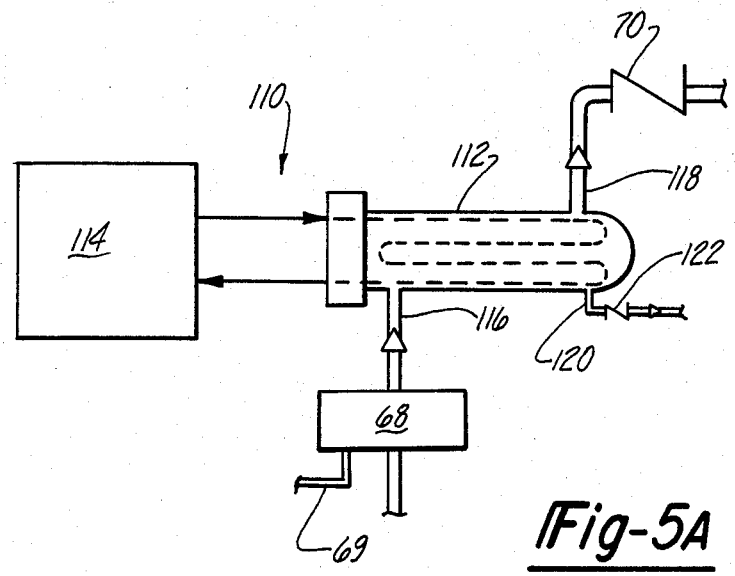
FIG. 5A is a schematic representation of a refrigeration system which may optionally be included in the apparatus in order to remove moisture from the gaseous fuel.
Figure 5B:
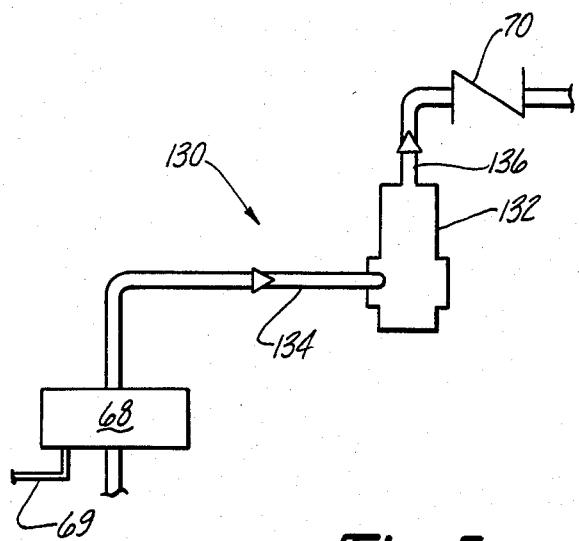
FIG. 5B is a schematic representation of still another optional moisture-removing system, comprising a vortex-type refrigeration apparatus.

Since at ambient temperatures most gaseous fuels are capable of containing vaporized or entrained lubricants or moisture, an optional moisture-removing means may be included downstream of the lubricant filter and separator 68. The inclusion of such moisture-removing means is, of course, optional if desired or deemed necessary. Two of several alternate embodiments of the optional moisture-removing means are shown in FIGS. 5A and 5B, and will be described in detail below.

The previously cooled compressed gaseous fuel next preferably flows through a check valve 70 and into one or more adsorbent filters 72. The sorbent filter 72 preferably comprises a chamber containing a sorbent material, such as a zeolite, an activated carbon, a silica gel, or various clays, for example. The sorbent filter 72 preferably functions to remove any remaining compressor lubricants or other materials, e.g. $H_2S$, etc., and also to remove the so-called "heavy end" constituents of the gaseous fuel and oil that may have been in a vapor state from the compressor means. Generally speaking, such heavy end constituents include propane and other constituents that are heavier than methane. The purpose of removing such heavy end constituents is to maximize the capablity of the storage tanks on the vehicle (or other gaseous fuel consuming device) to sorptively store the constituents of the gaseous fuel for which the vehicle's engine or other fuel consuming device is designed.

From the sorbent filter 72, the compressed gaseous fuel flows through a check valve 76, and then flows into an inlet 78 for one or more optional, but preferred, sorbent storage vessels 82, or flows into the refueling module discharge system 86. The path of the fuel flow depends upon the function of a control system (described below) which automatically opens or closes various solenoid valves in response to various gas pressure conditions throughout the system. It should be noted that the sorbent storage vessels 82 are optional, but preferred. An even less expensive refueling apparatus according to the present invention may be provided that eliminates the sorbent storage tanks (and their associated controls and apparatus) altogether, or that includes storage tanks that do not contain a sorbent material therein.

If the outlet conduit 20 is disconnected from the vehicle or other gaseous fuel consuming device, and the gas pressure in the sorbent storage vessels 82 is below a predetermined pressure level, the compressed gaseous fuel will flow through the inlet 78 and a preferably electrically-operated solenoid valve 80 to recharge the sorbent storage vessels 82. Such recharging of the storage vessels 82 will also occur even if the outlet conduit 20 is still connected to the vehicle storage system 100 and the pressure in the vehicle storage vessels or tanks is generally at or above a desired pressure level, generally approximately 300 to 350 psig (2070 to 2415 kPa). Alternatively, if the pressure in the vehicle's storage tanks is below such desired pressure level, the control system (described below) will cause the compressed gaseous fuel to flow through a preferably electrically-operated solenoid valve 90 and into a manual discharge valve 96, which may be either in the outlet conduit 20 or incorporated into the connector device 22. Preferably, a check valve 101 is included in the vehicle storage system 100 to prevent the gaseous fuel from returning to the refueling apparatus.

Downstream of the solenoid valve 90, a vent line 88 is preferably provided for venting compressed gaseous fuel from the outlet conduit 20 when the connector 22 is disconnected from the vehicle or other gaseous fuel consuming device after the refueling operation is completed. As will be described in detail below, the preferred control system automatically causes a preferably electrically-operated solenoid valve 94 to open in order to allow such vented compressed gaseous fuel to be released into a holding chamber or vessel 98. Once the pressure in the outlet conduit 20 has been reduced to a sufficiently low level, the solenoid valve 94 closes, to isolate the holding chamber 98 between the solenoid valve and a check valve 48. Upon later actuation of the gas compressors, the gaseous fuel in the holding chamber 98 is caused to flow through the check valve 48 into the suction 40 of the first stage gas compressor 42. The above-described automatic venting system for the outlet conduit 20 is optional, but is preferably included in the refueling module system in order to relieve the pressure in the outlet conduit 20, thereby allowing for ease of disconnection of the connector 22. It should be noted, however, that the manual discharge valve 96 is preferably a three-way manually-operated valve which also allows the operator to manually vent the outlet conduit 20 directly to the atmosphere or to other gas collection or disposal means in order to allow for ease of disconnecting the connector 22.

The refueling module 10 also preferably includes a pressure relief valve 37, which is upstream of the check valve 38 and which opens in response to an unacceptably high gas pressure level and relieves such pressure by venting the gas to the atmosphere through an atmospheric vent 25. Similarly, a pressure relief valve 53 is provided on the discharge 44 of the first stage gas compressor 42, and a pressure relief valve 73 is provided at the outlet of the adsorbent filter 72. The pressure relief valves 53 and 73 are adapted to open in response to undesirably high gas pressures and to relieve such pressures by venting gaseous fuel through their respective vent lines 55 and 75 and the atmospheric vent 25.

The lubricant filter and separator 56 on the discharge side of the first stage gas compressor 42 is adapted to collect compressor lubricants from the compressed gaseous fuel and return them to the suction 40 of the first stage gas compressor 42 through a return line 57 and a preferably electrically-operated solenoid valve 61. Similarly, the lubricant filter and separator 68 is adapted to collect compressor lubricants and return them to the suction 62 of the second stage gas compressor 64 through a return line 69 and a preferably electrically-operated solenoid valve 71. Because of the well-known difficulty in starting or activating a gas compressor without first balancing the pressure between the suction and discharge sides of the compressor, the control system (described below) is also adapted to cause the solenoid valves 61 and 71 to remain closed whenever the first and second stage gas compressors 42 and 64 are activated, and further adapted to cause the solenoid valves 61 and 71 to open whenever the first and second stage gas compressors 42 and 64 are deactivated. Such opening of the solenoid valves 61 and 71 provides fluid communication between the suctions and discharges of their respective gas compressors in order to balance the gas pressures across the compressors, thereby allowing the compressors to restart upon reactivation thereof. Furthermore, the flow of gas between the suctions and discharges of the respective compressors, through their respective return lines 57 and 69, also provides sufficient motivating force and pressure to forcibly urge the collected lubricants from the separators 56 and 68 to the respective suctions 40 and 62 of the respective gas compressors 42 and 64.

Figure 4:
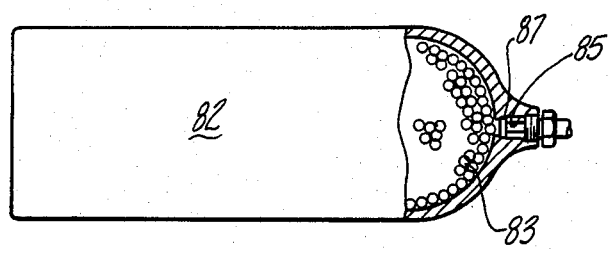
FIG. 4 illustrates one of the fuel storage or filter vessels of the exemplary refueling apparatus of FIG. 1, with a portion of the vessel's wall broken away to reveal its interior.

Referring to FIG. 4, an exemplary sorbent storage vessel 82 includes a sorbent material 83 that is contacted by the gaseous fuel flowing through the inlet 85. As referred to herein, the terms "sorbent" and "sorptive" are intended to refer to both adsorbing or absorbing, or both. Preferably, the inlet 85 of the sorbent storage vessel 82 includes an inlet filter 87, which may comprise a screen mesh-type filter, a fibrous-type filter, or other filter means known in the art that is suitable for substantially preventing the introduction of particles or other impurities into the sorbent material 83. The sorbent material 83 may comprise any of a number of sorbents, such as activated carbon, zeolite compounds, silica gels, or various clays, for example. Such sorbent materials may be in the form of pellets, spheres, granulated particles, or other suitable forms whereby the surface area of the sorbent material is optimized in order to maximize the amount of gaseous fuel adsorbed or absorbed (or both) thereby. The present invention also contemplates the use of liquid absorbents, such as a liquid coating on an adsorbent material, for example. The sorbent filter 72 includes a similar sorbent material and has a somewhat similar tank-like construction and configuration to that shown in FIG. 4 for the sorbent storage vessel 82, except that the filter 72 has separate inlets and outlets.

Although activated carbon was used as a sorbent material in one actually-constructed prototype embodiment of the exemplary refueling module 10, and is generally regarded to be the preferred sorbent material for the sorbent filter 72 and the sorbent storage vessel 82, other sorbent materials may be alternatively employed. Specific examples of such sorbent materials are listed below:

As mentioned above, most gaseous fuels are capable of containing vaporized or other entrained lubricants or liquid materials, even at ambient temperatures. Therefore, if found to be necessary or desired, an optional moisture-removing means may be included downstream of the lubricant filter and separator 68. One of several alternate embodiments of such optional moisture-removing means is illustrated schematically in FIG. 5A. An exemplary moisture removal system 110 generally includes a heat exchanger 112 operatively connected to a conventional refrigeration system 114 and adapted for cooling the gaseous fuel in order to cause vaporized or entrained lubricants or other liquids to be precipitated out from the gaseous fuel stream. The heat exchanger 112 includes a gas inlet 116 and a gas outlet 118, with refrigerant from the refrigeration system 114 being conveyed therethrough. The refrigerant from the refrigeration system 114 and the gaseous fuel are isolated from one another in the shell-and-tube heat exchanger 112 (or other suitable heat transfer device). As the gaseous fuel is cooled, the lubricants or other liquids are precipitated out and conveyed from the heat exchanger 112 through a drain line 120 and a check valve 122, and are then either returned to the suction side of one of the gas compressors or otherwise conveyed to a suitable disposal means.

Another alternate embodiment of the optional moisture-removing means is shown schematically in FIG. 5B. An exemplary alternate moisture removal system 130 generally includes a vortex tube apparatus 132 having a gas inlet 134 and a gas outlet 136. Devices such as the vortex tube 132 are well-known in the art and are adapted to impart a vortex or otherwise generally spinning flow path to the gaseous fuel flowing therethrough, thereby cooling the fuel so that lubricants or other entrained liquids may be separated out. An example of such a vortex tube separator is the so-called "Vor-

| ADSORBENT MATERIAL | MANUFACTURER | PRODUCT DESIGNATION |
| --- | --- | --- |
| Activated Carbon | Calgon Corp. | BPL 4 × 10 Mesh Coal Base |
| Activated Carbon | Calgon Corp. | PCB 4 × 10 Mesh Coconut Base |
| Activated Carbon | American Norit Company, Inc. | Sorbonorit B4 Pellets |
| Activated Carbon | Westvaco Chemical Company | Nuchar S-A |
| Activated Carbon | Westvaco Chemical Company | Nuchar WV-A 14 × 35 Wood Base Granular |
| Activated Carbon | Witco Chemical Division | Columbia Grade 9LXC Powder Low Ash Coal Base |
| Activated Carbon | Witco Chemical Division | Columbia Grade 9LXC Pellet Low Ash Coal Base |
| Activated Carbon | American Norit Company | Norit RB-3 |
| Zeolite (Natural) | Anaconda Minerals Company | 2020A/D1 |
| Zeolite (Synthetic) | Union Carbide Corp. Linde Division | Metal Alumino Silicate 13X 8 × 12 Beads |
| Zeolite (Synthetic) | Union Carbide Corp. Linde Division | Metal Alumino Silicate 4A 8 × 12 Beads |
| Zeolite (Synthetic) | Union Carbide Corp. Linde Division | Metal Alumino Silicate 5A ⅛" Pellets |
| Zeolite (Synthetic) | Union Carbide Corp. Linde Division | Metal Alumino Silicate 13X Powder |
| Zeolite (Natural) | Anaconda Minerals Company | 5050 L |
| Zeolite (Natural) | Double Eagle Petroleum and Mining Company | Clinoptilolite |
| Silica Gel | — | — |
| Clay | — | — | tex Tube", manufactured and sold by Vortec Corporation of Cincinnati, Ohio.

The inclusion of one of the moisture removal systems 110 or 130, or other suitable moisture removal apparatus is optional in the refueling module 10, but may be deemed desirable or necessary in order to reduce contamination of the sorbent filter 72, thereby prolonging the useful life of the sorbent material therein.

The operation of the exemplary refueling module 10 may best be described with reference to the schematic flow diagram of FIG. 3. In order to discharge gaseous fuel from the refueling module 10 into the vehicle storage system 100, the outlet conduit 20 is connected to the vehicle storage system by way of the connector device 22, the manual discharge valve 96 is opened, and the refueling module is energized (as described below). When the refueling module 10 is energized, the solenoid valves 80, and 90 are caused to open and the solenoid valve 94 is caused to close. The pressurized gaseous fuel in the sorbent storage vessels 82 is thereby discharged through the outlet conduit 10 to the vehicle storage system 100. Simultaneously, a timer device (described below) starts and runs for a predetermined period of time. At the end of such time, the pressure in the storage vessels 82 and the vehicle storage system 100 are approximately equalized, and the solenoid valve 80 is caused to close, the compressors 42 and 64 are started, the cooling fan 52 is started, the solenoid valve 34 is opened, and the solenoid valves 61, 71 and 94 are closed.

The compressors 42 and 64, and the cooling fan 52, continue to run until the pressure in the vehicle storage system 100 is pressurized to a predetermined pressure level. When the predetermined pressure level in the vehicle storage system is reached, the pressure switch 92 causes the solenoid valve 90 to close and the solenoid valve 80 to open, thereby allowing the storage vessels 82 to be recharged and pressurized to their predetermined pressure level.

It should be noted that the control system preferably prioritizes the functions of the refueling module such that if the storage vessels 82 are charged to their predetermined levels, the vehicle storage system 100 receives gaseous fuel from the storage vessels first and then from the gas compressors 42 and 64. If the storage vessels 82 are not so pressurized when the refueling module is connected to the vehicle storage system, the gaseous fuel bypasses the storage vessels to first supply the vehicle storage system before recharging the storage vessels.

When the desired pressure in the storage vessels 82 is reached, the pressure switch 84 causes the solenoid valves 34 and 80 to close and causes the compressors 42 and 64 and the cooling fan 52 to be deactivated. Simultaneously, the pressure switch 84 causes the solenoid valves 61 and 71 to open in order to balance the gaseous fuel pressure on the suction and discharge sides of their respective gas compressors. As discussed above, compressed gaseous fuel flows from the discharge side to the suction side of the first stage gas compressor 42 and simultaneously forcibly urges collected compressor lubricants in the lubricant filter and separator 56 through the return line 57 and into the suction 40 of the first stage gas compressor. Similarly, when the solenoid valve 71 is opened, collected compressor lubricants are forced from the lubricant filter and separator 68 through the return line 69 and into the suction 62 of the second stage gas compressor 64. When the refueling apparatus is shut down, the pressure switch 92 causes the solenoid valve 94 to open in order to vent the gaseous fuel from the outlet conduit 20 to the holding chamber 98, thereby allowing the outlet conduit to be easily disconnected.

The pressure switch 74 may optionally be included and set at a pressure level slightly higher than that of the pressure switches 92 and 84. Thus the pressure switch 74 may function as part of a safety shut-off system that automatically shuts down the entire refueling module system in the event of an unacceptably high gas pressure level therein. As a further safety feature, the pressure relief valves 37, 53 and 73 may be set at a pressure slightly higher than that of the optional pressure switch 73 (if included) and serve to automatically relieve the pressure in the system if the pressure continues to build even after the system is shut down.

FIG. 6 illustrates an exemplary electrical control system adapted to cause the refueling module to function as described above. One skilled in the art will readily recognize, of course, that other control systems, either electrical or of other types, may alternatively be employed. In order to initiate operation of the exemplary refueling module 10, an on-off breaker switch 154 is closed. The closing of the on-off switch 154 causes the preferably red indicator lamp R to illuminate, indicating that the gas compressors are not activated, and further causes the preferably green indicator lamp G to illuminate, indicating that the sorbent storage vessels 82 are charged and pressurized to their predetermined level.

In order to discharge gaseous fuel from the refueling module 10 into the vehicle storage system 100, the outlet conduit 20 is connected to the vehicle storage system by way of connector 22, the manual discharge valve 96 is opened, and the vehicle fill switch 156 is closed and held closed by the operator until the indicator lamp G shuts off. The closing of the vehicle fill switch 156 completes a circuit to cause the relay R1 to be energized, which closes the contacts R1a and R1b and opens the contacts R1c, thereby causing the solenoid valves 90 and 80 to open, the solenoid valve 94 to close, and the timer T1 to start. The compressed gaseous fuel in the sorbent storage vessels 82 is thus allowed to discharge through the outlet conduit 20 into the vehicle storage system 100. The decrease in the pressure of the sorbent storage vessels 82 initially causes the pressure switch 84 to close, thereby shutting off the indicator lamp G and energizing the relay R2 in order to close its contacts R2a, R2b and R2c. At this time, the vehicle fill switch 156 may be released to its open position because both of the contacts R1a and R2a are closed.

After a predetermined time established by the timer T1, the pressures in the storage vessels 82 and in the vehicle storage system 100 are approximately equalized, and the timer T1 causes its contacts T1a to close and T1b to open, thereby energizing the compressor relay C and closing the solenoid valve 80 to isolate the storage vessels 82. The relay C closes its contacts Ca and Cb, causing the compressors 42 and 64, as well as the cooling fan 52 to start. At the same time, the preferably amber indicator lamp A is illuminated (to indicate that the compressors and fan are running), and the relay R5 is energized. The energized relay R5 opens the contacts R5a and thus shuts off the indicator lamp R.

The compressors 42 and 64 continue to run until the pressure in the vehicle storage system is pressurized to a predetermined pressure level, causing the pressure switch 92 to open and thereby closing the solenoid valve 90. The opening of the pressure switch 92 also energizes the relay R4, which causes its contacts R4a and R4b to close and R4c to open.

Once the storage tank 82 has been recharged to its predetermined pressure, the pressure switch 84 again opens to de-energize the relay R2 and illuminate the indicator lamp G. The de-energization of the relay R2 opens the contacts R2a and R2b, thereby de-energizing the relay R1, and opens the contacts R2b. The de-energization of the relay R1 in turn opens the contacts R1a and R1b to reset the system and to de-energize the timer T1 and close the solenoid valve 80. As a result, the contacts T1a simultaneously open to de-energize the relay C (and thus deactivate the compressors and cooling fan) and to open the normally open solenoid valves 61 and 71 in order to balance the pressures across the compressors and force the compressor lubricants back to the suction thereof. Also, the solenoid valve 94 is caused to open to vent the gaseous fuel from the outlet conduit 20 into the holding chamber 98.

It should be noted that if for any reason the power is interrupted during the refueling operation, the vehicle fill switch 156 must be pushed again in order to resume refueling. Also, if for any reason, the system becomes overpressurized, the optional pressure switch 73 automatically shuts down the system as discussed above.

On some occasions, the refueling operation may be interrupted or terminated before the pressure in the vehicle storage system 100 reaches the predetermined pressure that opens the pressure switch 92, thereby preventing the storage tanks 82 from being recharged. One example of such an occasion is when the vehicle is needed by the user before the refueling operation is completed. In such a case, the control system provides for recharging or refilling the storage tanks 82 other than as described above at the completion of a full refueling operation.

To recharge the storage vesels, operation of the refueling module is initiated by closing the on-off breaker switch 154 as described above, thereby illuminating the indicator lamp R and energizing the relay R2 through the closed pressure switch 84. As a result the contacts R2a, R2b, R2c are closed. The optional storage tank fill switch 160 is depressed to energize the relay R3, thus closing the contacts R3a, R3c and R3d, and opening the contacts R3b. This allows the optional switch 160 to be released to its open position, causes the solenoid valve 80 to open, and starts the compressors and cooling fan by way of the relay C and its contacts Ca. Simultaneously, because contacts Cb are closed and the relay R5 is energized to open the contacts R5a, the lamp A is illuminated and the lamp R is shut off. The compressors and cooling fan then continue to run until the pressure in the storage tanks 82 reaches their predetermined level and the system is automatically shut down by the opening of the pressure switch 84 and the remainder of the sequence described above. It should be noted that if power is interrupted during the recharging of the storage tanks 82, the compressors and fan will be deactivated and thus the solenoid valve 80 will close. To resume the operation, the optional switch 160 must again be depressed. It should be noted that the switch 160 is optional, and if included, it functions as described above. Finally, it should also be noted that a stop switch 170 is provided to allow the operator to shut down the system manually if desired or necessary to do so.

Referring to FIG. 7, an overall perspective view of a low-pressure gaseous hydrocarbon fuel storage system and power plant 210 according to the present invention is shown. The power plant 210 represents an actually constructed embodiment of the present invention, and FIG. 7 shows the physical locations of the various components of the power plant 210 in conjunction with a vehicle 212 (shown in phantom) which was actually utilized to demonstrate the principles of the present invention. In the actually constructed embodiment, vehicle 212 is a 1983 Ford "EXP" model automobile. However, it should be appreciated that the principles of the present invention are not limited to the embodiment shown in FIG. 7, but are equally applicable to other embodiments of gaseous hydrocarbon fuel storage systems and power plants, as will become apparent from the description below.

Figure 8:
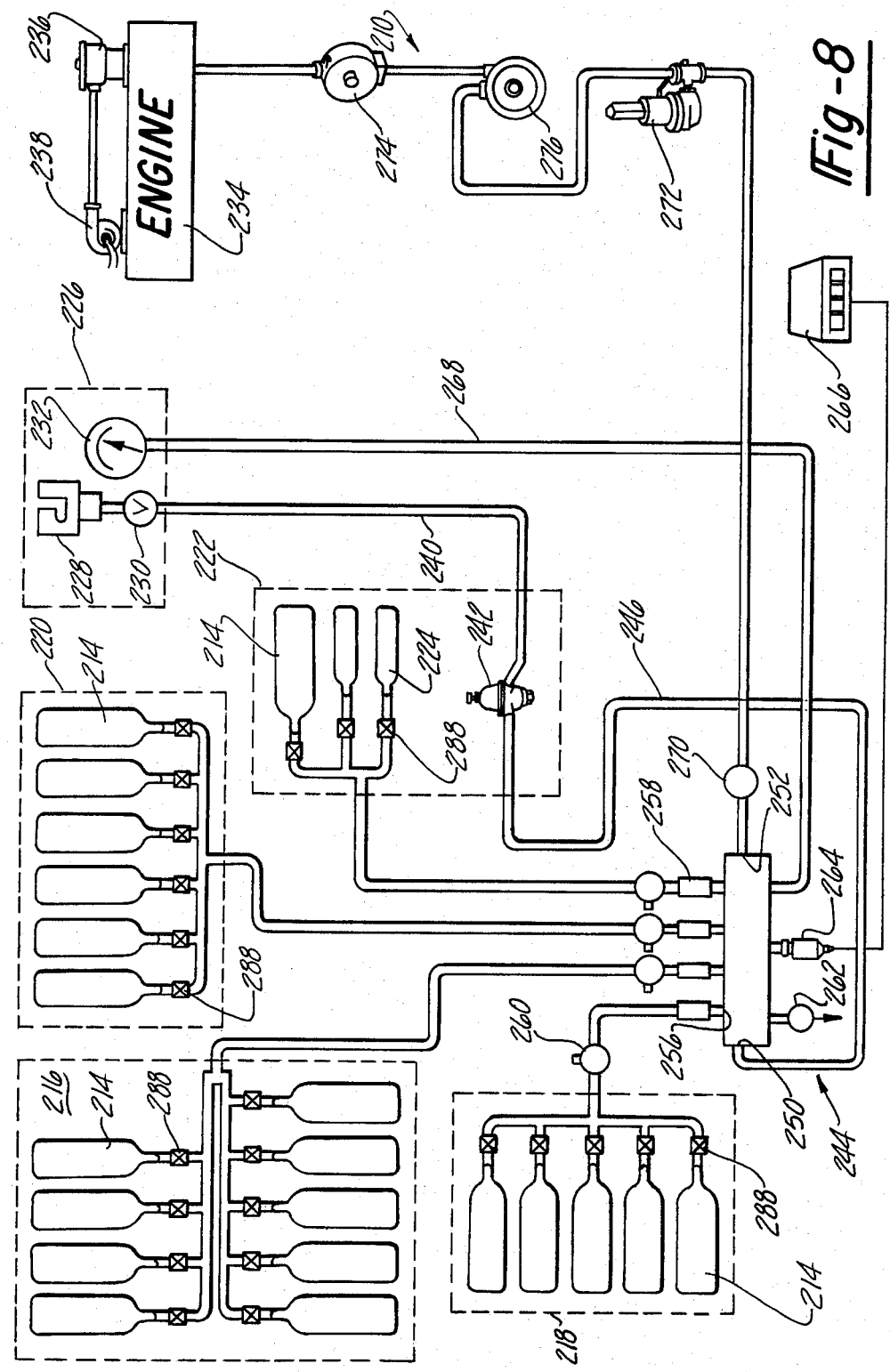
FIG. 8 is a schematic view of the low pressure gaseous hydrocarbon fuel storage system and power plant shown in FIG. 7.

Referring to FIG. 8, a schematic diagram of the power plant 210 is shown. Since some of the components of the power plant 210 may be best seen with reference to FIG. 8, both FIGS. 7 and 8 will be jointly used to describe the overall structure and operation of the power plant. The power plant 210 includes four distinct sets of cylinders 214 which are used to store a self-contained supply of the gaseous hydrocarbon fuel for the vehicle 212. While it is preferred that natural gas be used for the gaseous hydrocarbon fuel, other gaseous hydrocarbon fuels may also be utilized, such as propane, methane, and butane. Each of the sets of cylinders 214 are mounted in chambers which are enclosed and separated from the passenger compartment of the vehicle 212. Thus, the power plant 210 provides for a chamber 216 which houses nine cylinders, a chamber 218 which houses five cylinders, a chamber 220 which houses six cylinders, and a chamber 222 which houses three cylinders. These chambers are shown in phantom in FIG. 8. It should also be noted that the chamber 222 includes two cylinders 224 which are smaller than the cylinders 224 which are used throughout the rest of the storage system.

Accordingly, the storage system portion of the power plant 210 includes a total of twenty-three cylinders to store the natural gas or other gaseous hydrocarbon fuel. These twenty-three storage cylinders provide for a total gas storage capability of approximately 8.1 cubic feet (0.23 cubic meters). In the particular embodiment shown in FIGS. 7 and 8, the cylinders 214 and 224 are conventional fire-extinguisher type cylinders. The particular number and configuration of the cylinders 214 and 224 were chosen to conform to the space available in the vehicle 212, and thereby avoid any significant modifications to the structure of the vehicle 212 other than the removal of the gasolene tank which was originally equipped to the vehicle 212.

It should be appreciated that the principle of the present invention are not in any way limited to the particular number and configuration of cylinders shown in FIGS. 7 and 8. Indeed, the twenty-three cylinders may be replaced by a single storage vessel. Accordingly, it should be understood that a variety of suitable storage vessel types, shapes and sizes may be employed in accordance with the present invention. The only essential requirement of such storage vessels is that they are capable of being pressurized to the maximum pressure limits at which the storage system operates.

The power plant 210 also includes a fuel port 226 which is located on the vehicle in the place normally used to supply gasolene to the vehicle. The fuel port 226 comprises a quick connector assembly 228, a check valve 230, and a pressure gauge 232. The quick connector assembly 228, which is sealingly connectible to the above-described connector 22, is used to provide a fluid communication link to a stationary source of a gaseous hydrocarbon fuel from which the cylinders 214 and 224 may be charged or filled with this fuel.

The above-discussed refueling apparatus is adapted to compress or pressurize the gaseous fuel to a range of approximately 100 psig (689 kPa) to approximately 400 psig (2760 kPa). Accordingly, this refueling apparatus represents a low-pressure stationary supply source of the gaseous hydrocarbon fuel. One of the advantages of the present invention is that the vehicle storage system may be charged from either the preferred low-pressure stationary source of the fuel or a high-pressure source of the fuel. In the particular embodiment illustrated in FIGS. 7 and 8, gaseous hydrocarbon fuel may be supplied to the vehicle storage system at pressures up to 3000 psi (20.7 MPa), but is preferably supplied at pressures of approximately 300 to 350 psig (2070 to 2415 kPa). Such a high pressure stationary source of gaseous hydrocarbon fuel may also be provided, for example, by a fill station used in fleet operations.

The check valve 230 is used to permit flow of the gaseous hydrocarbon fuel from the refueling apparatus 10 to the storage cylinders 214 and 224 through the quick connector assembly 228, and also to prevent the flow of the gaseous hydrocarbon fuel from the storage cylinders out through the connector assembly. As with the quick connector assembly 228, the check valve 230 may be comprised of any conventional and commercially available device suitable for the operation described above. For example, the check valve 230 in one embodiment according to the present invention comprises a model B-8CPA2-350 check valve available from the Nupro Company, Willoughby, Ohio.

The pressure gauge 232 is used to provide a visual indication of the pressure in the storage cylinders 214 and 224. As will be appreciated by those skilled in the art, the pressure gauge 232 will be particularly useful when the storage system is being charged with the gaseous hydrocarbon fuel, as the pressure reading will be indicative of the amount of gas stored.

The above described fuel port 226 forms part of the conveying means according to the present invention which is used to convey the gaseous hydrocarbon fuel to the storage cylinders 214 and 224 from the refueling apparatus and for conveying the fuel stored in these cylinders to the prime mover of the vehicle 212. In the embodiment shown in FIGS. 7 and 8, this prime mover is generally comprised of an internal combustion engine 234. However, it should be appreciated that the principles of the present invention are not limited to any particular type of prime mover, providing that the prime mover has means for combining the gaseous hydrocarbon fuel with air to produce the mechanical energy therefrom necessary to move the vehicle 212. In the embodiment shown in FIGS. 7 and 8, this combining means is comprised of a carburetor 236 and a turbo charger 238. The carburetor 236 is specifically designed to be operable with gaseous hydrocarbon fuels such as natural gas. In one form of the present invention, the carburetor 236 is a model CA100-8 carburetor which is available from Impco Carburetion, Inc., Cerritos, Calif. Additionally, in this actually constructed embodiment of the present invention, the turbo charger 238 is a model RHB5 turbo charger available from Warner-Ishi, Decatur, Ill. As will be appreciated by those skilled in the art, the turbo charger 238 is used to increase the pressure of the intake air to the engine, and therefore provide for additional horsepower.

Since the power plant 210 is intended to operate solely upon a gaseous hydrocarbon fuel rather than gasoline, certain advantageous modifications to the engine 234 were made in the actually constructed embodiment of FIG. 7. These modifications were designed to optimize the performance of the engine 234 in conjunction with the use of natural gas as the fuel for the engine 234. Firstly, the compression ratio to this standard equipment engine for the vehicle 212 was increased from 8:1 to 13.6:1 in order to take advantage of the relatively high octane rating of natural gas. As will be appreciated by those skilled in the art, each increment in the compression ratio generally provides for a 3% improvement in thermodynamic efficiency for each incremental increase in compression ratio. This increase in the compression ratio was achieved by installing longer pistons in the engine and appropriately milling the engine head to decrease the available volume in the engine cylinders. It should also be noted that the engine timing was appropriately advanced to account for the difference in the flame speed of gasolene and natural gas. It should be further noted that the conversion of the vehicle 212 to a natural gas powered vehicle permitted the catalytic converter and the other standard pollution control equipment to be removed from the vehicle. The elimination of this equipment was in recognition of the fact that natural gas is a much more cleaner burning fuel (i.e. fewer objectionable emissions) than gasoline.

Turning again to the means for conveying the gaseous hydrocarbon fuel to the storage cylinders 214 and 224 and from these cylinders to the carburetor 236 of the engine 234, a high pressure conduit 240 is provided to receive the gaseous hydrocarbon fuel supplied at the fuel port 226. The high pressure conduit 240 is preferably made from stainless steel and capable of withstanding pressures up to 3000 psi (20.7 MPa). A high pressure regulator 242 is mounted in the chamber 222 and connected to the high pressure conduit 240 for defining the maximum pressure at which the gaseous hydrocarbon fuel is stored in the cylinders 214 and 224. Specifically, the high pressure regulator 242 operates to reduce pressures from as high as 3000 psi (20.7 MPa) to a maximum pressure of 300 psig (2070 kPa). Accordingly, the maximum pressure at which gaseous hydrocarbon fuel can be stored in the cylinders 214 and 224 is approximately 300 psig (2070 kPa).

In the actually constructed embodiment of the present invention shown in FIGS. 7 and 8, the high pressure regulator 242 is comprised of a model 1301G high pressure regulator available from Fisher Controls Company, Marshall Town, Iowa. However, as with all of the various components to the power plant 210, the principles of the present invention are not limited to the particular high pressure regulator utilized in the actually constructed embodiment of FIGS. 7 and 8. Thus, it should be appreciated that other pressure regulating devices may be employed to provide suitable maximum pressure limits in the appropriate applications. For example, while it is preferred that the maximum pressure at which gaseous hydrocarbon fuel is stored to be within the range of approximately 100 psig (689 kPa) to approximately 400 psig (2760 kPa), higher or lower maximum pressure limits may also be employed. However, it should be understood that one of the principal advantages of the present invention is that the power plant 210 is capable of storing reasonable amounts of the gaseous hydrocarbon fuel at relatively low pressures, i.e. pressures below approximately 500 psig (3450 kPa). Indeed, with a 300 psig (2070 kPa) pressure limit the range of the actually constructed embodiment according to the present invention has been shown to be approximately 100–110 miles (161–177 km) in tests where the vehicle 210 was travelling at a constant velocity of 45 miles per hour (72 km per hour).

One of the important components of the conveying means is a manifold assembly 244 which is used to distribute the gaseous hydrocarbon fuel received from the stationary source to each of the cylinders 214 and 224. The manifold assembly 224 is also used to collect the gaseous hydrocarbon fuel stored in the cylinders 214 and 224 in order to convey this fuel to the carburetor 236 of the engine 234. The manifold assembly 244 is connected to the high pressure regulator 242 via a low pressure conduit 246. It should be noted that as a result of the low pressure operation it is preferred that the conduit 246 as well as the other remaining conduits in the power plant 210 be made from copper. However, of course, other suitable materials may also be employed to construct these conduits, such as coated aluminum and braided steel hose.

Figure 11:
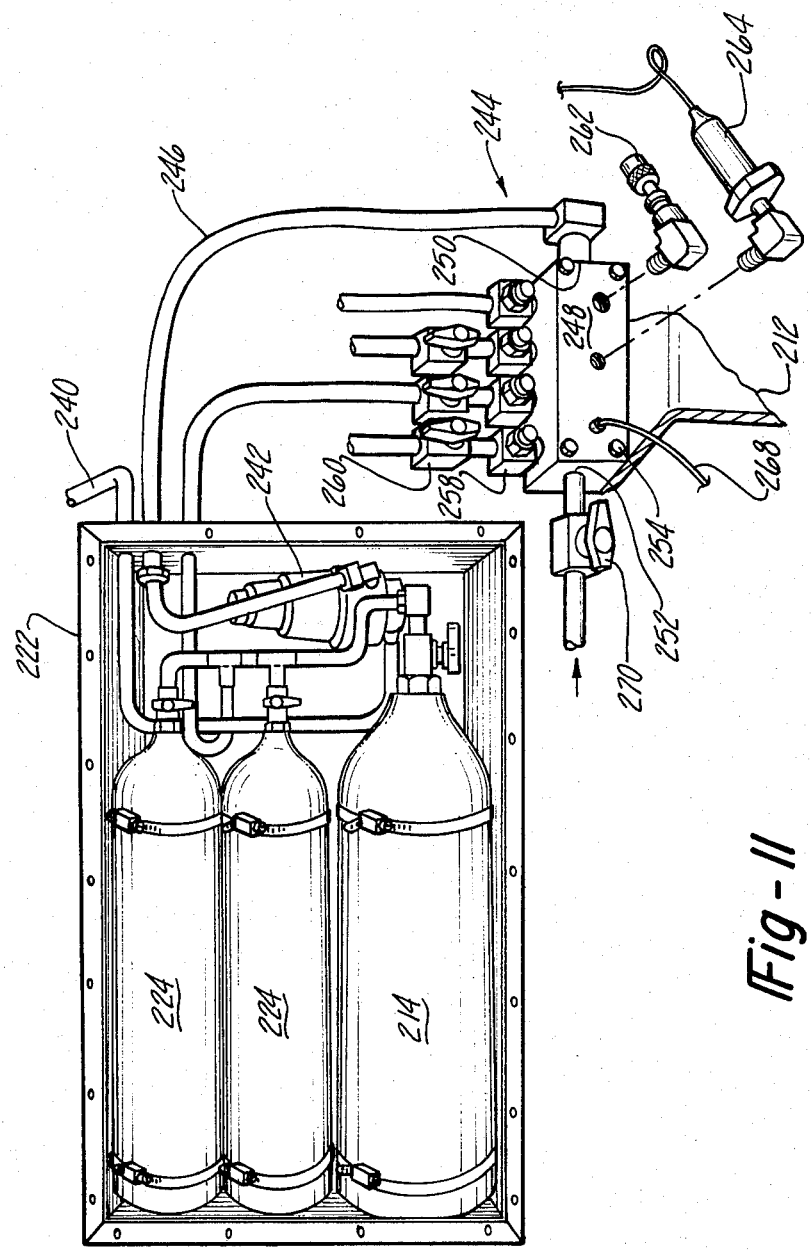
FIG. 11 is a perspective view of a portion of the low pressure gaseous hydrocarbon fuel storage system and power plant shown in FIG. 7, particularly illustrating the manifold means according to the present invention.

The manifold assembly 244 includes a manifold block 248, which may best be seen with reference to FIG. 11. The manifold block 248 is preferably made out of aluminum, and includes an inlet port 250 for receiving the gaseous hydrocarbon fuel from the stationary source and an outlet port 252 for conveying the gaseous hydrocarbon fuel stored in the cylinders 214 and 224 to the carburetor 236 of the engine 234. A plurality of bolts 254 are provided to mount the manifold block 248 to the vehicle 212. The manifold block 248 also includes a bi-directional port for conveying the gaseous hydrocarbon fuel to and from each of the chambers 216–222. Thus, for example, the manifold block 248 includes a bi-directional port 256 for conveying the gaseous hydrocarbon fuel to and from the cylinders 214 contained in the chamber 218.

The manifold assembly 244 also includes a filter element 258 connected to each of the bi-directional ports of the manifold blocks 248 for filtering the flow of the gaseous hydrocarbon fuel to each of the chambers 216–222. In the actually constructed embodiment of FIG. 7, these filter elements 258 each comprise a TF series Nupro filter. However, it should be appreciated that any other filter means known in the art that is suitable for substantially preventing the introduction of particles or other impurities into the cylinders 214 and 224 may be utilized. Thus, for example, fiberous-type filers, screen-mesh filters, and filters of sintered construction may be suitably employed.

Also interposed between the manifold block 248 and the chambers 218–222 is a three-way valve 260. These three-way valves 260 are used for individually controlling the flow of the gaseous hydrocarbon fuel to and from each of the chambers 216–222. Thus, for example, the three-way valve 260 interposed between the chamber 218 and the manifold block 248 may be manually closed to prevent the flow of any gaseous hydrocarbon fuel to or from the cylinders 214 contained in this chamber. In the actually constructed embodiment of FIG. 7, these three-way valves 260 are also used to permit gas samples to be obtained from each of the chambers 216–222.

The manifold assembly 244 also includes a pressure relief valve 262 which is used to insure that the pressure in the storage cylinders 214 and 224 does not exceed a predetermined pressure limit. Preferably, this predermined pressure limit should exceed the maximum pressure range of the storage system by a predetermined amount, such as 25 psig (172 kPa) to 150 psig (1034 kPa). In the actually constructed embodiment of FIG. 7, the pressure relief valve 262 is adapted to open at 425 psig (2930 kPa).

The manifold assembly 244 also includes a transducer 264 for sensing the pressure within the cylinders 214 and 224. The transducer 264 may be any suitable pressure transducer such as a Kulite type IPTE-1000 pressure transducer. The pressure transducer 264 generates an electrical signal output to a digital display 266 located in the passenger compartment of the vehicle 212, which is used to provide a visual indication of the pressure sensed by the transducer. Accordingly, it will be appreciated that the digital display 266 serves as a fuel gauge for the operator of the vehicle 212. It should also be noted that the pressure gauge 232, described above, is also connected to the manifold block 248 via a conduit 268.

Finally, the manifold assembly 244 also includes a manual valve 270 for controlling the flow of the gaseous hydrocarbon fuel from the outlet port 252 of the manifold block 248 to the carburetor 236 of the engine 234. Thus, the valve 270 provides a means for manually turning off all flow of the gaseous hydrocarbon fuel from the cylinders 214 and 224 to the engine 234, such as for maintenance of the power plant 210 and the like. In the actually constructed embodiment of FIG. 7, the valve 270 is comprised of a Nupro B8P6T series valve.

The power plant 210 also includes means for controlling the flow of the gaseous hydrocarbon fuel from the storage system to the carburetor 236 of the engine 234. This controlling means is generally comprised of a pair of regulators 272–274, and switch 276. The regulators 272 and 274 are used to reduce the pressure of the gaseous hydrocarbon fuel conveyed to the carburetor 236. In the actually constructed embodiment of FIG. 7, the regulator 272 is comprised of a Fisher 620 series regulator which reduces the pressure from 300 psig (2070 kPa) to 100 psig (689 kPa), and the regulator 274 is comprised of an Impco model PEV regulator which reduces the pressure from 100 psig (689 kPa) to approximately atmospheric pressure. The switch 276 is used for selectively permitting flow of the gaseous hydrocarbon fuel from the storage system to the carburetor 234, and is adapted to be responsive to the closing of the ignition switch or the energization of the engine 234. In the actually constructed embodiment of FIG. 7, the switch 276 is comprised of an Impco series VFF-30 fuel lock filter. Again, with regard to the switch 276, as well as to all the other components of the power plant 210, the principles of the present invention are not limited to the specific actually constructed embodiment of FIG. 7, and it should be understood that other suitable components may be employed equally as well.

Figure 9:
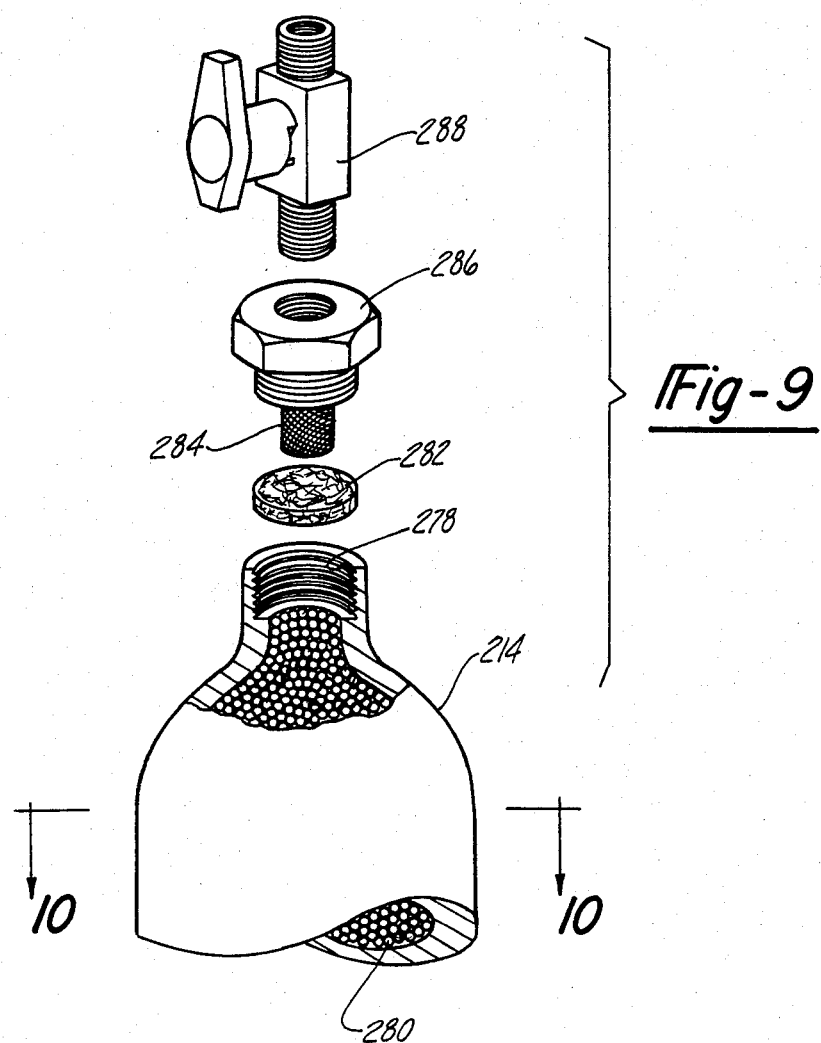
FIG. 9 is an exploded assembly view of one of the gaseous hydrocarbon fuel storage cylinders shown in FIG. 7.
Figure 10:
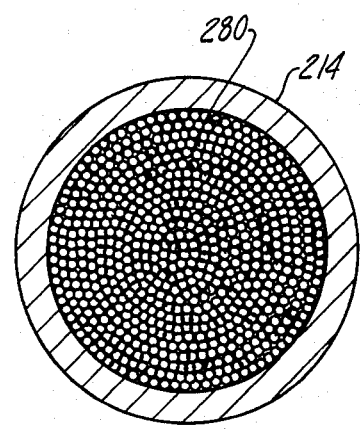
FIG. 10 is a cross-sectional view of the cylinder shown in FIG. 8, taken along lines 10—10.

Referring to FIGS. 9 and 10, the specific construction of the storage cylinders 214 and 224 will now be described. Each of the storage cylinders includes an inlet/outlet port 278 for conveying the gaseous hydrocarbon fuel to and from the cylinders. Importantly, each of the storage cylinders 214 and 224 contain a predetermined sorbent material 280 for reducing the pressure at which the gaseous hydrocarbon fuel is stored within the cylinders. As referred to herein, the terms "sorbent" or "sorptive" are intended to refer to "adsorbents", "absorbents", or both. The sorbent material like the sorbent material described above in connection with the refueling apparatus, may comprise any of a number of adsorbents or molecular sieves, such as activated carbon, zeolite compounds, silica gels, or various clays, for example. Such adsorbent materials may be in the form of pellets, spheres, granulated particles, or other suitable forms whereby the surface area of the adsorbent material is optimized in order to maximize the amount of gaseous fuel adsorbed on the surface thereof. The present invention also contemplates the use of liquid absorbents, such as a liquid coating on an adsorbent material.

Although Columbia grade 9LXC activated carbon pellets were used as the sorbent material 280 in the actually-constructed embodiment of FIG. 7, and is generally regarded to be the preferred sorbent material, other sorbent materials may be alternatively employed. Specific examples of such sorbent materials are listed above in connection with the above discussion of the refueling apparatus.

It should be noted that it has been found advantageous to activate the preferred carbon sorbent material 280 before putting the storage system of the power plant 210 in use. Specifically, the sorbent material is first packed into the cylinders 214 and 224 to the maximum extent possible, and each of the cylinders is evacuated. Then each of the cylinders is placed in an oven or otherwise heated and then heated again. The preferred sorbent material discussed above, in connection with the refueling module, is similarly activated.

Each of the cylinders 214 and 224 include two filters 282 and 284 which are used to substantially prevent the introduction of particles or other impurities into the sorbent material 280, as well as to insure that the sorbent material 280 is retained within the cylinders 214 and 224. In the actually constructed embodiment of FIG. 7, the filter 282 is a gas permeable, fiberous polyester disc, and the filter 284 is a stainless steel mesh strainer element obtained from a Nupro TF series filter. Each of these mesh strainer elements were secured to a steel cap 282 of the cylinders via a press fit relationship. Additionally, it should be noted that each of the cylinders 214 and 224 is also provided with a valve 288 for selectively permitting flow of the gaseous hydrocarbon fuel to and from each of these cylinders and to maintain a vacuum while activating the sorbent material. Such filters are also preferably included in the filter 72 and the storage vessels 82 described above.

Figure 12:
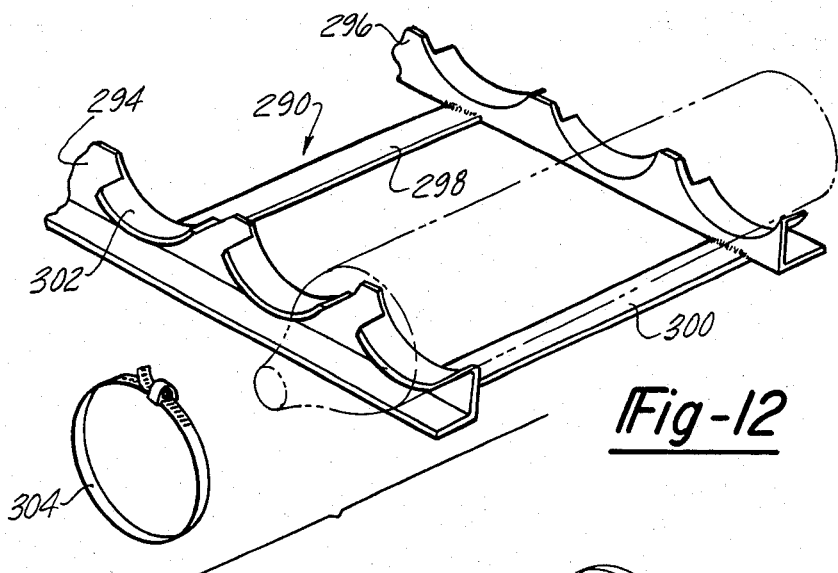
FIG. 12 is a perspective view of a first cradle used to mount the stored cylinders in the vehicle.
Figure 13:
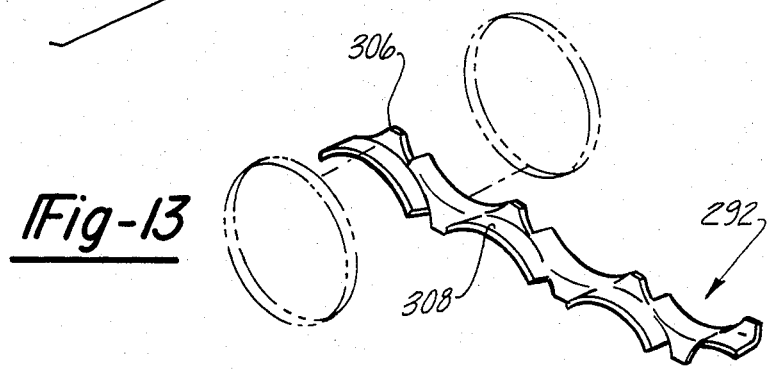
FIG. 13 is a perspective view of a second cradle used to mount the stored cyliners in the vehicle.
Figure 14:
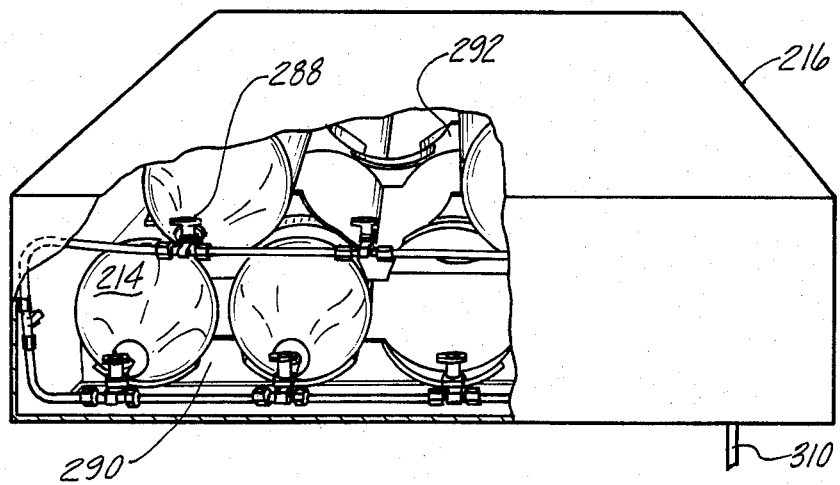
FIG. 14 is a perspective cut-away view of a double row chamber in accordance with the present invention.

Referring now to FIGS. 12, 13 and 14, the general construction of the chambers 216–222 and the structure for mounting the cylinders 214 and 224 in these chambers will now be described. FIG. 12 illustrates a first cradle 290 which is used in all of the chambers 216–222 for securing the cylinders to the chambers. FIG. 13 illustrates a second cradle 292 which is used to secure the upper row of cylinders to the lower row of cylinders in the chamber 216, as illustrated in FIG. 14.

The cradle 290 is generally comprised of two rack members 294 and 296 which are aligned generally in parallel and connected by a pair of bracket members 298 and 300. Each of the rack members 294 and 296 are formed with a plurality of arcuate flange portions 302 which confom to the shape of the cylinders and are adapted to nestingly receive the cylinders. A conventional clamping ring 304 is then used to secure each end of the cylinders to the respective rack members 294 and 296 by tightening the clamping rings 304 around the cylinders and the flange portions 302.

The cradle 292 comprises a pair of independent rack members 306 which are shaped such that they may be interposed between the upper and lower rows of cylinders in the chamber 216. Each of the rack members 306 includes a plurality of alternately facing arcuate flange portions 308. The flange portions 308 on one side of the rack member 306 are used to mount the rack member to the lower row of cylinders in the chamber 216 via conventional clamping rings, while the flange portions 308 on the other side of the rack member are used to secure the upper row of cylinders to the lower row of cylinders in this chamber.

Referring to FIG. 14, a perspective cut-away view of the completely assembled chamber 216 is shown. Firstly, it should be noted that the cradle 290 may be secured to the chamber 216 by any conventional means known to those skilled in the art. Additionally, the chamber 216 may be constructed out of any suitable material for housing the cylinders 214. In the actually constructed embodiment of FIG. 7, the chamber 216 was generally constructed of aluminum. To provide for a generally gas tight seal, a gasket was interposed between the top portion and the sidewalls of the chamber 216. In order to facilitate the removal of any condensation which may occur on the cylinders 214 during the operation of the vehicle 212, the chamber 216 is provided with a vent tube 310 which is adapted to permit the chamber to be vented to the atmosphere exterior of the vehicle. A similar vent tube is also provided on each of the other chambers 218–222.

Referring generally to FIGS. 15-19, a second embodiment of a gaseous hydrocarbon fuel storage system and power plant 312 is shown. FIG. 15 illustrates a schematic view of this power plant. One of the significant differences between the power plant 312 and the power plant 210 is that the power plant 312 provides for only a single storage vessel 314, which may be, for example, a conventional propane tank. While it may be advantageous in many applications to have only one or two storage vessels, it should also be noted that one advantage to having a number of storage vessels is that the heat transfer characteristics of the storage system will generally be better when a number of storage vessels are employed. Since heat is generally during the sorption process, this heat will, in general, be more readily liberated from a number of smaller vessels in comparison to a single larger vessel. However, if desired, suitable heat exchange means may, of course, be added to the construction of a single vessel, such as the storage vessel 314.

As in the case of the cylinders 214 and 224, the storage vessel 314 is filled with a suitable sorbent material 315 for reducing the pressure at which the gaseous hydrocarbon fuel is stored. The storage vessel 314 is also provided with a filter assembly 316 which may best be seen with reference to FIG. 10. The filter assembly 316 includes an aluminum block 318 which is secured to the storage vessel 314 via a plurality of bolts 320. A conventional 80 micron filter 322 is secured to the block 318 via a bolt 324. The block 318 is also formed with eight circumferentially spaced passageways 326 which provide a fluid communication link between the filter 322 and the conduit means used to convey the gaseous hydrocarbon fuel to and from the storage vessel 314. These passageways 326 may best be seen with reference to FIG. 17 which is a cross-sectional view of the filter assembly 316 taken along lines 17—17 of FIG. 16.

The filter 322 is comprised of a plurality of adjacently disposed copper plates or discs 328. A perspective view of one of these copper plates 228 is shown in FIG. 18. Each of these copper plates 328 includes a total of eight circumferentially spaced openings 330 and a slot 332 extending radially outwardly from these openings to provide an outlet for the filter having a magnitude of 80 microns. As will be appreciated by those skilled in the art, each of the copper plates 328 are aligned such that the openings 330 form vertical passageways along the length of the filter 322. The filter assembly 316 also includes a gas permeable, fibrous filter which is preferably, although not necessarily, made from a suitable polyester material. This fibrous filter element 334 is interposed between the filter 322 and the sorbent material 315.

As may be seen in both FIGS. 15 and 16, the storage vessel 314 is also provided with a relief valve 336 and a manual shut-off valve 338. The relief valve 336 operates to insure that the pressure in the storage vessel 314 does not exceed the maximum pressure at which the power plant 312 is intended to operate.

The power plant 312 also includes a fuel port 340 which generally comprises a quick connector assembly 342, a check valve 344 and a pressure gauge 346. Interposed between the fuel port 340 and the storage vessel 314 is an sorptive filter 348 which forms an important part of the present invention. A cross-sectional view of the sorptive filter is shown in FIG. 19. The sorptive filter 348 is comprised of a vessel 350 which contains a predetermined sorbent material 352 for filtering the flow of the gaseous hydrocarbon fuel to the storage vessel 314. The vessel 350 may be any shape or construction which is capable of withstanding the maximum pressure at which the power plant 312 is intended to operate. However, it is generally preferred that the size of filter vessel 350 be related to the size of the storage vessel 314. Specifically, it has been found advantageous to provide at least 0.0052 cubic feet (0.147 cubic millimeters) of filter capacity to each cubic foot (0.028 cubic meters) of storage capacity. With regard to the sorbent material 352, it is preferred that this sorbent material be comprised of activated carbon. In this regard, both the sorbent material 352 contained in the sorptive filter 348 and the sorbent material 315 contained in the storage vessel 314 may both be comprised of activated carbon.

The sorptive filter 348 is provided with a filter element 354 and a gas permeable, fibrous filter element 356 at each end thereof. These two filter elements may be similar in construction to either those corresponding filter elements shown in FIG. 9 or 16, or other suitable filter construction.

It should be noted that the sorptive filter 348 is associated with the conveying means of the power plant 312 such that the gaseous hydrocarbon fuel supplied by a stationary source thereof must first pass through the sorptive filter before being stored in the storage vessel 314. Likewise, before the stored gaseous hydrocarbon fuel can be conveyed to a carburetor 358 of the power plant 312, this fuel must again pass through the sorptive filter 348. During the charging of the stored vessel 314, the sorptive filter 348 adsorptively and/or absorptively removes predetermined constituents, including any oderants that have been previously introduced into the gaseous fuel, of the gaseous hydrocarbon fuel before the gaseous hydrocarbon fuel is conveyed to the stored cylinder 314. These predetermined constituents include, for example, oil, water vapor, and so-called "heavy end" constituents of the fuel. Generally speaking, such heavy end constituents include propane and other constituents that are heavier than methane. The purpose of removing such heavy end constituents is to maximize the capability of the storage vessel 314 to sorptively store lighter hydrocarbons, such as methane, for example. It is also important to note that the sorptive filter 348 operates to prevent the accumulation over time of any unwanted fuel constituents in the storage vessel 314. The filter assembly 316 is merely a mechanical filter for removing undesirable materials from the fuel.

When the engine for the power plant 312 is energized and enabled to consume the gaseous hydrocarbon fuel stored in the storage vessel 314, the sorptive filter 348 operates to desorptively re-introduce the removed constituents, including the oderant material, to the flow of the gaseous hydrocarbon fuel from the stored cylinder 314 to the carburetor 358 of the engine. Accordingly, it should be appreciated that the sorptive filter 348 is self-cleaning during each charge and discharge cycle of the storage system and further reintroduces the oderant, if any, into the gaseous fuel when it is in the engine compartment.

In order to assist the desorption of the undesirable constituents from the sorbent material 352 contained in the filter 348, means for increasing the temperature of the sorptive filter 348 may also be provided in the appropriate application. Preferably, this temperature increasing means is associated with the engine of the power plant 312 so that the heat generated by the operation of the engine is utilized by the temperature increasing means. One form of a suitable temperature increasing means is shown in FIG. 15 to be a conduit 360 which is wrapped around the sorptive filter 348. This conduit could be connected, for example, to either the engine cooling system or to the engine exhaust system in order to utilize at least a portion of the waste heat generated by the engine. Additionally, it may be advantageous in some applications to simply locate the sorptive filter in relatively close proximity to the engine in order to utilize the heat radiated by the engine.

Another significant difference between the power plant 210 of FIG. 7 and the power plant 312 of FIG. 15, is that the power plant 312 is adapted to operate as a dual fuel system. This dual fuel operation is controlled by a pair of solenoid valves 362 and 364. The solenoid valve 362 is used to control the flow of the gaseous hydrocarbon fuel from the storage vessel 314 to an air/fuel mixer 366 operatively associated with the carburetor 358. Whereas, the solenoid valve 364 is used to control the flow of gasolene from a suitable gasoline tank (not shown) to the carburetor 358 of the engine. It should also be noted that a two-stage regulator 368 is interposed between the solenoid valve 362 and the air/fuel mixer 366. This regulator 368 is used to reduce the pressure of the gaseous hydrocarbon fuel from approximately 300 psig (2070 kPa) to approximately atmospheric pressure. The solenoid valves 362 and 364 may be operable in response to one or more switches contained in the passenger compartment of the vehicle which are used to determine which source of fuel supply will be provided to the engine. Accordingly, it should be appreciated that if the vehicle operator desires gasoline to be supplied to the engine, the solenoid valve 364 must be opened and the solenoid valve 362 must be closed. Similarly, if the vehicle operator desires that the gaseous hydrocarbon fuel be supplied to the engine, the solenoid valve 362 must be opened and the solenoid valve 364 must be closed.

It should be noted that in such a dual-fuel power plant, it will be difficult to provide an engine whose performance is optimized for both types of fuel. However, there are commercially available devices which are capable of automatically adjusting the timing of the engine in response to a switch between the type of fuel being supplied to the engine.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. In a system having a gaseous hydrocarbon fuel powered vehicle and a refueling apparatus for said vehicle, the improvement comprising in combination:

inlet means on said refueling apparatus adapted to be connected in fluid communication with a source of said gaseous fuel;

compressor means on said refueling apparatus for compressing said gaseous fuel in order to increase the pressure thereof up to a first predetermined pressure level;

cooling means on said refueling apparatus for decreasing the temperature of said compressed gaseous fuel;

sorbent filter means on said refueling apparatus for sorptively removing at least a portion of certain predetermined constituents of said gaseous fuel therefrom;

discharge means on said refueling apparatus for supplying said compressed gaseous fuel to said vehicle, said discharge means including a discharge fluid conduit selectively and releasably connectable to a fuel inlet means on said vehicle in order to selectively refuel the same;

at least one storage vessel on said refueling apparatus, said refueling apparatus storage vessel containing a sorbent material therein for sorptive storage of a first predetermined quantity of said compressed gaseous fuel in said refueling apparatus storage vessel;

vehicle storage means for storing a second predetermined quantity of said compressed gaseous fuel on said vehicle, said vehicle storage means including a sorbent material for sorptively storing said second predetermined quantity of said compressed gaseous fuel;

refueling apparatus control means for supplying said filtered and compressed gaseous fuel to said vehicle from either said compressor means or said refueling apparatus storage vessel, said control means causing said filtered and compressed gaseous fuel to be supplied to said vehicle from said refueling apparatus storage vessel when the pressure therein is generally at or above a second predetermined pressure level and further causing said refueling apparatus storage vessel to be bypassed by said filtered and compressed gaseous fuel when said refueling apparatus storage vessel pressure drops below a third predetermined level, said refueling apparatus control means further causing said filtered and compressed gaseous fuel to be supplied to said refueling apparatus storage vessel after said discharge fluid conduit has been selectively disconnected from said vehicle fuel inlet means or alternatively after the pressure of the compressed gaseous fuel in said vehicle storage means has increased to a fourth predetermined pressure level, said compressed gaseous fuel being supplied to said refueling apparatus storage vessel until the pressure in said refueling apparatus storage vessel is generally at said second predetermined pressure level;

a prime mover on said vehicle having means for combining said compressed gaseous fuel with air to produce mechanical energy necessary to move said vehicle;

means on said vehicle for conveying said compressed gaseous fuel to said vehicle storage means from said fuel inlet means and for conveying said compressed gaseous fuel from said vehicle storage means to said combining means of said prime mover; and vehicle sorbent filter means on said vehicle associated with said conveying means for sorptively filtering the flow of said compresssed gaseous fuel to said vehicle storage means, said vehicle sorbent filter means including a sorbent material.

2. The improvement according to claim 1, wherein the maximum pressure at which said compressed gaseous fuel is stored in said vehicle storage means is less than approximately 500 psig (3450 kPa).

3. The improvement according to claim 1, wherein the maximum pressure at which said compressed gaseous fuel is stored in said vehicle storage means is in the range of approximately 100 psig (689 kPa) to approximately 400 psig (2760 kPa).

4. The improvement according to claim 3, wherein said vehicle sorbent filter means sorptively removes at least a portion of predetermined constitutents of said compressed gaseous fuel before said compressed gaseous fuel is conveyed to said vehicle storage means.

5. The improvement according to claim 4, wherein said vehicle sorbent filter means is associated with said conveying means such that the flow of said compressed gaseous fuel from said vehicle storage means to said combining means of said prime mover also passes through said vehicle sorbent filter means.

6. The improvement according to claim 5, wherein said vehicle sorbent filter means desorptively reintroduces at least a portion of said previously removed predetermined constituents to the flow of said compressed gaseous fuel from said vehicle storage means to said combining means of said prime mover.

7. The improvement according to claim 6, wherein said vehicle includes means for increasing the temperature of said vehicle sorbent filter means when said compressed gaseous fuel is conveyed from said vehicle storage means and through said vehicle sorbent filter means to said combining means of said prime mover.

8. The improvement according to claim 7, wherein said prime mover generates heat during operation thereof, said temperature increasing means is associated with said prime mover such that at least a portion of the heat generated by the operation of said prime mover is utilized by said temperature increasing means.

9. The improvement according to claim 3, wherein the sorbent material of said vehicle storage means and the sorbent material of said vehicle sorbent filter means are both comprised of activated carbon.

10. The improvement according to claim 4, wherein said predetermined constituents include water, vapor, oil, propane and butane.

11. The improvement according to claim 1, wherein said sorbent material of said refueling apparatus storage vessel is comprised of activated carbon.

12. The improvement according to claim 1, wherein said control means further deactivates said compressor after the compressed gaseous fuel pressure in said refueling apparatus storage vessel has increased generally to said second predetermined level.

13. In a system having a gaseous hydrocarbon fuel powered vehicle and a refueling apparatus for said vehicle, the improvement comprising in combination:
    inlet means on said refueling apparatus adapted to be connected in fluid communication with a source of said gaseous fuel;
    compressor means on said refueling apparatus for compressing said gaseous fuel in order to increase the pressure thereof up to a first predetermined pressure level;
    cooling means on said refueling apparatus for decreasing the temperature of said compressed gaseous fuel;
    said compressor means including first stage compression means for initially increasing the pressure of said gaseous fuel and second stage compression means for further increasing the pressure of said compressed gaseous fuel from said first stage compression means, said cooling means including an interstage heat exchanger adapted to decrease the temperature of said compressed gaseous fuel from said first stage compression means before it is further compressed in said second stage compression means;
    discharge means on said refueling apparatus for supplying said compressed gaseous fuel from said second stage compressor means to said vehicle, said discharge means including a discharge fluid conduit selectively and releasably connectable to a fuel inlet means on said vehicle in order to selectively refuel the same;
    vehicle storage means on said vehicle for storing a predetermined quantity of said compressed gaseous fuel from said second stage compressor means, said vehicle storage means including a sorbent material for sorbing said predetermined quantity of said compressed gaseous fuel from said second stage compressor means;
    a prime mover on said vehicle having means for combining said compressed gaseous fuel from said second stage compressor means with air to produce the mechanical energy therefrom necessary to move said vehicle;
    means on said vehicle for conveying said compressed gaseous fuel from said second stage compressor means to said vehicle storage means from said fuel inlet means and for conveying said compressed gaseous fuel from said second stage compressor means from said vehicle storage means to said combining means of said prime mover; and
    sorbent filter means on said vehicle associated with said conveying means for sorptively filtering the flow of said compressed gaseous fuel from said second stage compressor means to said vehicle storage means, said sorbent filter means including a sorbent material.

14. The improvement according to claim 13, wherein said first stage and said second stage compression means each comprise a separate hermetically-sealed gas compressor.

15. The improvement according to claim 13, wherein said compressor means comprises a hermetically-sealed two-stage compressor, said two-stage compressor being adapted for fluid connection of said interstage heat exchanger between stages.

16. The improvement according to claim 1, further comprising moisture separating means between said cooling means and said refueling apparatus sorbent filter means, said moisture removal means including a vortex tube device.

17. The improvement according to claim 1, further including lubricant filter means on the discharge of said compressor means for substantially trapping and collecting any compressor means lubricants from said compressed gaseous fuel, fluid conduit means connecting said lubricant filter means with the suction of said compressor means, said conduit means including valve means therein, and said refueling apparatus control means maintaining said valve means in its closed condition when said compressor means is activated and opening said valve means when said compressor means is deactivated to cause a quantity of compressed gaseous fuel to flow from said discharge to said suction of said compressor means in order to substantially balance the pressure therebetween and to forcibly return said collected lubricants to the suction of said compressor means.

18. The improvement according to claim 1, wherein said compression means comprises at least one hermetically-sealed gas compressor.

19. The improvement according to claim 1, wherein said cooling means includes at least one heat exchanger coil on said refueling apparatus, said heat exchanger coil having its interior connected in fluid communication with the discharge of said compressor means in order to convey said compressed gaseous fuel therethrough, said cooling means further including air conveying means associated with said heat exchanger coil for directing ambient air over said heat exchanger coil in order to cool said compressed gaseous fuel therein.

20. The improvement according to claim 13, further including lubricant filter means on the discharge of each of said first and second stage compressor means for substantially trapping and collecting any compressor means lubricants from said compressed gaseous fuel therefrom, fluid conduit means separately connecting each of said lubricant filter means with the suction of its associated compressor means, each said conduit means including valve means therein, and control means for maintaining each said valve means in its closed condition when its associated compressor means is activated and for opening each said valve means when its associated compressor means is deactivated to cause compressed gaseous fuel to flow from said discharge to said suction of its associated compressor means in order to substantially balance the pressure therebetween and to forcibly return said collected lubricants to the suction of its associated compressor means.

21. (New) The improvement according to claim 20, wherein the maximum pressure at which said compressed gaseous fuel from said second stage compressor means is stored in said vehicle storage means is in the range of approximately 100 psig (689 kPa) to approximately 400 psig (2760 kPa).

ing means for increasing the temperature of said vehicle adsorbent filter means when said compressed gaseous natural gas is conveyed from said vehicle storage means to said combining means of said prime mover, said vehicle adsorbent filter means desorptively re-introducing at least a portion of said removed predetermined constituents to the flow of said compressed gaseous natural gas from said vehicle storage means to said combining means of said prime mover; and lubricant filter means on the discharge of each of said first and second stage compressor means for substantially trapping and collecting any compressor means lubricants from said compressed gaseous natural gas therefrom, fluid conduit means separately connecting each of said lubricant filter means with the suction of its associated compressor means, each said conduit means including valve means therein, and control means for maintaining each said valve means in its closed condition when its associated compressor means is activated and for opening each said valve means when its associated compressor means is deactivated to cause compressed gaseous natural gas to flow from said discharge to said suction of its associated compressor means in order to substantially balance the pressure therebetween and to forcibly return said collected lubricants to the suction of its associated compressor means.

25. The improvement according to claim 24, further comprising moisture separating means between said air cooling means and said refueling apparatus adsorbent filter means.

26. The improvement according to claim 25, wherein interstage heat exchanger and said secondary heat exchanger decreases the temperature of the compressed gaseous natural gas to approximately the ambient air temperature, said moisture separating means including refrigeration means for further cooling said compressed gaseous natural gas below the ambient air temperature in order to separate moisture therefrom.

27. The improvement according to claim 26, wherein said interstage heat exchanger includes at least one coil having its interior connected in fluid communication with the discharge of said first stage compressor means in order to convey said compressed gaseous natural gas therethrough, said interstage heat exchanger further including air conveying means associated with said coil for directing ambient air over said coil in order to cool said compressed gaseous fuel therein.

28. The improvement according to claim 27, wherein said secondary heat exchanger includes at least one secondary coil having its interior connected in fluid communication with the discharge of said second stage compressor means in order to convey said compressed gaseous natural gas therethrough, said secondary heat exchanger further including air conveying means associated with said secondary coil for directing ambient air over said secondary coil in order to cool said compressed gaseous natural gas therein.

29. In a system having a gaseous hydrocarbon fuel powered vehicle and a refueling apparatus for said vehicle, the improvement comprising in combination:

inlet means on said refueling apparatus adapted to be connected in fluid communication with a source of said gaseous fuel;

compressor means on said refueling apparatus for compressing said gaseous fuel in order to increase the pressure thereof up to a predetermined pressure level;

cooling means including a heat exchanger on said refueling apparatus for decreasing the temperature of said compressed gaseous fuel from said compressor means;

discharge means on said refueling apparatus for supplying said compressed gaseous fuel from said compressor means to said vehicle, said discharge means including a discharge fluid conduit selectively and releasably connectable to a fuel inlet means on said vehicle in order to selectively refuel the same;

vehicle storage means on said vehicle for storing a predetermined quantity of said compressed gaseous fuel from said compressor means, said vehicle storage means including a sorbent material for sorbing said predetermined quantity of said compressed gaseous fuel from said compressor means;

a prime mover on said vehicle having means for combining said compressed gaseous fuel from said compressor means with air to produce the mechanical energy therefrom necessary to move said vehicle;

means on said vehicle for conveying said compressed gaseous fuel from said compressor means to said vehicle storage means from said fuel inlet means and for conveying said compressed gaseous fuel from said compressor means from said vehicle storage means to said combining means of said prime mover; and sorbent filter means on said vehicle associated with said conveying means for sorptively filtering the flow of said compressed gaseous fuel from said compressor means to said vehicle storage means, said sorbent filter means including a sorbent material.

30. The improvement according to claim 29, wherein said compressor means comprises a single-stage hermetically-sealed gas compressor.

31. The improvement according to claim 29, further including lubricant filter means on the discharge of said compressor means for substantially trapping and collecting any compressor means lubricants from said compressed gaseous fuel therefrom, fluid conduit means connecting said lubricant filter means with the suction of said compressor means, said conduit means including valve means therein, and control means for maintaining said valve means in its closed condition when said compressor means is activated and for opening said valve means when said compressor means is deactivated to cause compressed gaseous fuel to flow from said discharge to said suction of said compressor means in order to substantially balance the pressure therebetween and to forcibly return said collected lubricants to the suction of said compressor means.

32. The improvement according to claim 31, wherein the maximum pressure at which said compressed gaseous fuel from said compressor means is stored in said vehicle storage means is in the range of approximately 100 psig (689 kPa) to approximately 400 psig (2760 kPa).

33. The improvement according to claim 32, wherein said vehicle sorbent filter means is associated with said conveying means such that the flow of said compressed gaseous fuel from said vehicle storage means to said combining means of said prime mover also passes through said vehicle sorbent filter means, said vehicle sorbent filter means sorptively removing at least a portion of predetermined constituents of said compressed gaseous fuel before said compressed gaseous fuel is 22. (New) The improvement according to claim 21, wherein said vehicle sorbent filter means is associated with said conveying means such that the flow of said compressed gaseous fuel from said vehicle storage means to said combining means of said prime mover also passes through said vehicle sorbent filter means, said vehicle sorbent filter means sorptively removing at least a portion of predetermined constituents of said compressed gaseous fuel before said compressed gaseous fuel is conveyed to said vehicle storage means, said vehicle sorbent filter means desorptively re-introducing at least a portion of said removed predetermined constituents to the flow of said compressed gaseous fuel from said vehicle storage means to said combining means of said prime mover, and said vehicle further including means for increasing the temperature of said vehicle sorbent filter means when said compressed gaseous fuel is conveyed from said vehicle storage means to said combining means of said prime mover.

23. The improvement according to claim 22, wherein said sorbent material comprises activated carbon.

24. In a system having a gaseous natural gas fuel powered vehicle and a refueling apparatus for said vehicle, the improvement comprising in combination:

inlet means on said refueling apparatus adapted to be connected in fluid communication with a source of said gaseous natural gas;

hermetically-sealed compressor means on said refueling apparatus for compressing said gaseous natural gas in order to increase the pressure thereof up to a predetermined maximum pressure level;

air cooling means on said refueling apparatus for decreasing the temperature of said compressed gaseous natural gas;

said hermetically-sealed compressor means including first stage compression means for initially increasing the pressure of said gaseous natural gas and second stage compression means for further increasing the pressure of said compressed gaseous natural gas from said first stage compression means, said air cooling means including an interstage heat exchanger adapted to decrease the temperature of said compressed gaseous natural gas from said first stage compression means before it is further compressed in said second stage compression means, said air cooling means including a secondary heat exchanger adapted to decrease the temperature of said compressed gaseous natural gas from said second stage compression means;

adsorbent filter means on said refueling apparatus for adsorptively removing at least a portion of certain predetermined constituents of said compressed gaseous natural gas from said second stage compression means;

discharge means on said refueling apparatus for supplying said compressed gaseous natural gas from said second stage compressor means to said vehicle, said discharge means including a discharge fluid conduit selectively and releasably connectable to a fuel inlet means on said vehicle in order to selectively refuel the same;

at least one storage vessel on said refueling apparatus, said refueling apparatus storage vessel containing an adsorbent material therein for adsorptive storage of a first predetermined quantity of said compressed gaseous natural gas in said refueling apparatus storage vessel;

vehicle storage means on said vehicle for storing a second predetermined quantity of said compressed gaseous natural gas from said second stage compressor means, said vehicle storage means including an adsorbent material for adsorbing said predetermined quantity of said compressed gaseous natural gas, said compressed gaseous natural gas being stored by said vehicle storage means at a maximum pressure in the range of approximately 100 psig (689 kPa) to approximately 400 psig (2760 kPa);

refueling apparatus control means for supplying said filtered and compressed gaseous natural gas to said vehicle from either said compressor means or said refueling apparatus storage vessel, said control means causing said filtered and compressed gaseous natural gas to be supplied to said vehicle from said refueling apparatus storage vessel when the presure therein is generally at or above a second predetermined pressure level and further causing said refueling apparatus storage vessel to be bypassed by said filtered and compressed gaseous natural gas, when said refueling apparatus storage vessel pressure drops below a third predetermined level; said refueling apparatus control means further causing said compressed gaseous natural gas to be supplied to said refueling apparatus storage vessel after said discharge fluid conduit has been selectively disconnected from said vehicle fuel inlet means or alternatively after the pressure of the compressed gaseous natural gas in said vehicle has increased to a fourth predetermined pressure level, said compressed gaseous natural gas being supplied to said refueling apparatus storage vessel until the pressure in said refueling apparatus storage vessel is generally to said second predetermined pressure level; said control means further deactivating said compressor after the compressed gaseous natural gas pressure in said refueling apparatus storage vessel has increased generally to said second predetermined level;

a prime mover on said vehicle having means for combining said compressed gaseous natural gas from said second stage compressor means with air to produce mechanical energy therefrom necessary to move said vehicle;

means on said vehicle for conveying said compressed gaseous natural gas from said second stage compressor means to said vehicle storage means from said fuel inlet means and for conveying said compressed gaseous natural gas from said vehicle storage means to said combining means of said prime mover;

adsorbent filter means on said vehicle associated with said conveying means for adsorptively filtering the flow of said compressed gaseous natural gas from said second stage compressor means to said vehicle storage means, said adsorbent filter means including an adsorbent material, said vehicle sorbent means being associated with said conveying means such that the flow of said compressed gaseous natural gas from said vehicle storage means to said combining means of said prime mover also passes through said vehicle adsorbent filter means, said vehicle adsorbent filter means adsorptively removing at least a portion of predetermined constituents of said compressed gaseous natural gas before said compressed gaseous natural gas is conveyed to said vehicle storage means, said vehicle further includconveyed to said vehicle storage means, said vehicle sorbent filter means desorptively re-introducing at least a portion of said removed predetermined constituents to the flow of said compressed gaseous fuel from said vehicle storage means to said combining means of said prime mover, and said vehicle further including means for increasing the temperature of said vehicle sorbent filter means when said compressed gaseous fuel is conveyed from said vehicle storage means to said combining means of said prime mover.

34. The improvement according to claim 33, wherein said sorbent material comprises activated carbon.

* * * * *

UNITED STATES PATENT AND TRADEMARK OFFICE
CERTIFICATE OF CORRECTION

PATENT NO. : 4,522,159

DATED : June 11, 1985

INVENTOR(S) : Larry J. Engel et al

It is certified that error appears in the above-identified patent and that said Letters Patent is hereby corrected as shown below:

Column 1, line 62; "fleet-s-" should be --fleets--

Column 5, line 19; "primer" should be --prime--

Column 7, line 52; "silicon" should be --silica--

Column 8, line 40; "alternatively" should be --alternately--

Column 15, line 39; "vesels" should be --vessels--

Column 16, line 56; "principle" should be --principles--

Column 19, line 54; "filers" should be --filters--

Column 22, line 47; "generally" should be --generated--

Column 28, line 62; delete "(New)"

Column 29, line 1; delete "(New)"

Signed and Sealed this

Eleventh Day of March 1986

[SEAL]

Attest:

DONALD J. QUIGG

Attesting Officer

Commissioner of Patents and Trademarks